US008868872B2

(12) United States Patent
Mori et al.

(10) Patent No.: US 8,868,872 B2
(45) Date of Patent: *Oct. 21, 2014

(54) COMPUTING DEVICE SYSTEM AND INFORMATION MANAGING METHOD FOR REARRANGEMENT OF DATA BASED ON ACCESS CHARACTERISTIC RELATED TO A TASK

(71) Applicant: Hitachi, Ltd., Tokyo (JP)

(72) Inventors: Nobuhito Mori, Kawasaki (JP); Masaaki Iwasaki, Tachikawa (JP); Juichi Hara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,653

(22) Filed: Jan. 24, 2014

(65) Prior Publication Data

US 2014/0156927 A1 Jun. 5, 2014

Related U.S. Application Data

(63) Continuation of application No. 13/384,966, filed as application No. PCT/JP2011/072058 on Sep. 27, 2011, now Pat. No. 8,645,655.

(51) Int. Cl.
*G06F 12/00* (2006.01)
*G06F 3/06* (2006.01)

(52) U.S. Cl.
CPC ............ *G06F 3/0665* (2013.01); *G06F 3/0619* (2013.01); *G06F 3/061* (2013.01); *G06F 3/067* (2013.01); *G06F 3/0685* (2013.01); *G06F 3/0649* (2013.01)
USPC ............................ 711/165; 711/114; 711/170

(58) Field of Classification Search
USPC .................................................. 711/114, 165
See application file for complete search history.

(56) References Cited

U.S. PATENT DOCUMENTS

| | | | |
|---|---|---|---|
| 8,028,127 | B2 | 9/2011 | Kano et al. |
| 2003/0009619 | A1 | 1/2003 | Kano et al. |
| 2007/0055713 | A1 | 3/2007 | Nagai et al. |
| 2009/0300285 | A1 | 12/2009 | Nagai et al. |
| 2011/0197044 | A1 | 8/2011 | Sudo et al. |

FOREIGN PATENT DOCUMENTS

| | | |
|---|---|---|
| JP | 2003-015915 | 1/2003 |
| JP | 2007-066259 A | 3/2007 |
| WO | WO-2011/096017 A1 | 8/2011 |

OTHER PUBLICATIONS

Written Opinion of the International Search Authority PCT/JP2010/072058 dated Nov. 1, 2011; 4 pages.

*Primary Examiner* — John Lane
(74) *Attorney, Agent, or Firm* — Foley & Lardner LLP

(57) ABSTRACT

Technique for decision criterion for determining a transfer destination layer in rearrangement processing. A computer configures rearrangement reference information showing whether an access characteristic related to a task executed on a plurality of host computing devices is considered as a decision criterion for transfer destination determination in rearrangement processing of transferring data between actual storage areas of physical storage devices of different response performance. Storage subsystem refers to the rearrangement reference information and, based on an access characteristic of the plurality of computing devices with respect to the actual storage areas assigned to the plurality of computing devices, executes rearrangement processing of transferring data stored in the actual storage areas to different actual storage areas in the physical storage devices of different response performance.

17 Claims, 27 Drawing Sheets

A

B

| Logical volume ID (900) | Disk (901) | Raid level (902) | Stripe size (903) | Disk type (904) |
|---|---|---|---|---|
| 0 | 1, 2, 3, 4 | 5 | 32KB | SAS |
| 1 | 5, 6, 7, 8 | 5 | 32KB | SSD |
| ⋮ | ⋮ | ⋮ | ⋮ | ⋮ |
| k | m, m+1,... | 5 | 32KB | SAS |

| Virtual volume ID | Start LBA | End LBA | Pool ID | Page ID |
|---|---|---|---|---|
| 0 | 0x00000000 | 0x0001af0f | pool 1 | 0 |
| | 0x0001af10 | 0x0001ffff | | 1 |
| | 0x00020000 | 0x0020ffff | | 2 |
| | 0x00021000 | 0x0008ffff | | 4 |
| | ⋮ | ⋮ | | ⋮ |
| 1 | 0x00000000 | 0x0001af0f | pool 2 | 0 |
| | 0x0001af10 | 0x0001ffff | | 1 |
| | 0x00020000 | 0x0020ffff | | 2 |
| | 0x00021000 | 0x0008ffff | | 3 |
| | ⋮ | ⋮ | | ⋮ |
| ⋮ | ⋮ | ⋮ | ⋮ | ⋮ |

| Pool ID | Page ID | Logical volume ID | Start LBA | End LBA | Storage I/O count |
|---|---|---|---|---|---|
| pool 1 | 0 | 0 | 0x00000000 | 0x0001af0f | 4000 |
| | 1 | 0 | 0x00030000 | 0x000350ef | 1000 |
| | 2 | 0 | 0x00050000 | 0x000500ff | 5000 |
| | 3 | 1 | 0x00000000 | 0x0006efff | 1000 |
| | ⋮ | ⋮ | ⋮ | ⋮ | ⋮ |
| pool 2 | 0 | 5 | 0x00000000 | 0x0001a000 | 0 |
| | 1 | 5 | 0x00030000 | 0x000320ef | 0 |
| | 2 | 5 | 0x00050000 | 0x000500fe | 0 |
| | ⋮ | ⋮ | ⋮ | ⋮ | ⋮ |

| Pool ID | Layer | Logical volume ID |
|---|---|---|
| pool1 | Tier0 | 1 |
| | | 2 |
| | Tier1 | 0 |
| | | 3 |
| ⋮ | ⋮ | ⋮ |

| Logical volume ID | Start LBA | End LBA |
|---|---|---|
| 0 | 0x0001af10 | 0x0002ffff |
| | 0x000350f0 | 0x0004ffff |
| ⋮ | ⋮ | ⋮ |

| Virtual volume ID | I/O monitoring ON/OFF |
|---|---|
| 0 | ON |
| 1 | OFF |
| ⋮ | ⋮ |

| Pool ID | Page ID | Transfer original layer | Transfer destination layer |
|---|---|---|---|
| pool1 | 0 | Tier1 | Tier0 |
| | 1 | Tier0 | Tier1 |
| | 2 | Tier1 | Tier0 |
| | ⋮ | ⋮ | ⋮ |
| pool2 | 0 | Tier1 | Tier0 |
| | 1 | Tier1 | Tier0 |
| | 2 | Tier0 | Tier1 |
| | ⋮ | ⋮ | ⋮ |

| Host ID | Host WWN | Host volume ID | Storage volume ID |
|---|---|---|---|
| host1 | WWN1-1 | 0 | Virtual Volume 0 |
| | WWN1-2 | 1 | Virtual Volume 2 |
| | ⋮ | ⋮ | ⋮ |
| host2 | WWN2 | 0 | Virtual Volume 1 |
| | WWN2 | 1 | Logical volume 3 |
| | ⋮ | ⋮ | ⋮ |
| host3 | WWN3 | 0 | Virtual Volume 4 |
| ⋮ | ⋮ | ⋮ | ⋮ |

| Host ID | Task name | Task type | I/O monitoring necessity/unnecessity |
|---|---|---|---|
| host1 | Night summary batch 1 | Batch | Unnecessity |
| host1 | Commercial product index formation | Index formation | Unnecessity |
| host1 | OLTP1 | OLTP | Necessity |
| host2 | OLTP2 | OLTP | Necessity |
| host3 | OLTP3 | OLTP | Necessity |
| host3 | Antivirus A | Antivirus | Unnecessity |

2001 2002 2003 2004

2200

| Task name | Operation status | Host I/O issue amount |
|---|---|---|
| Night summary batch | ON | 10000 |
| Commercial product index formation | ON | 5000 |
| OLTP0 | OFF | 0 |

| Pool ID | Host ID | Rearrangement time zone | Layer upgrade capacity | Layer downgrade capacity |
|---|---|---|---|---|
| pool1 | host1 | 12:00-16:00 | 10GB | 10GB |
| | | 16:00-20:00 | 10GB | 5GB |
| | | 20:00-24:00 | 30GB | 30GB |
| | | ⋮ | ⋮ | ⋮ |
| pool2 | host2 | 12:00-18:00 | 20GB | 0GB |
| | | 18:00-24:00 | 5GB | 0GB |
| | | 24:00-6:00 | 10GB | 20GB |
| | | 6:00-12:00 | 30GB | 15GB |
| | host3 | 12:00-18:00 | 10GB | 25GB |
| | | 18:00-24:00 | 5GB | 5GB |
| | | 24:00-6:00 | 40GB | 10GB |
| | | 6:00-12:00 | 10GB | 15GB |
| ⋮ | ⋮ | ⋮ | ⋮ | ⋮ |

| Host ID | Task name | Operation status | Host I/O issue amount | Extraction time |
|---|---|---|---|---|
| host1 | Night summary batch | OFF | 0 | 12:00 |
| | | ⋮ | ⋮ | ⋮ |
| | Index formation | ON | 500 | 12:00 |
| | | ⋮ | ⋮ | ⋮ |
| | OLTP1 | ON | 3000 | 1200 |
| | | ⋮ | ⋮ | ⋮ |
| host2 | OLTP2 | ON | 5000 | 12:00 |
| | | ON | 10000 | 15:00 |
| | | ON | 6000 | 18:00 |
| | | ⋮ | ⋮ | ⋮ |
| host3 | OLTP3 | ON | 3000 | 12:00 |
| | | ON | 2000 | 15:00 |
| | | ON | 1000 | 18:00 |
| | | OFF | 0 | 21:00 |
| | | ⋮ | ⋮ | ⋮ |
| | Antivirus A | ON | 200 | 12:00 |
| | | ON | 300 | 15:00 |
| | | ON | 1000 | 18:00 |
| | | ON | 10000 | 21:00 |
| | | ⋮ | ⋮ | ⋮ |

| Task type | I/O monitoring OFF candidate |
|---|---|
| Batch | yes |
| Index formation | yes |
| OLTP | no |
| Antivirus | yes |
| ⋮ | ⋮ |

2701 2702

2900

| Pool ID | Page ID | I/O monitoring ON/OFF |
|---|---|---|
| pool1 | 0 | ON |
| | 1 | ON |
| | 2 | ON |
| | ⋮ | ⋮ |
| | k | OFF |
| | ⋮ | ⋮ |
| pool2 | 0 | OFF |
| | 1 | OFF |
| | 2 | OFF |
| | ⋮ | ⋮ |

2901 2902 2903

COMPUTING DEVICE SYSTEM AND INFORMATION MANAGING METHOD FOR REARRANGEMENT OF DATA BASED ON ACCESS CHARACTERISTIC RELATED TO A TASK

CROSS-REFERENCE TO RELATED PATENT APPLICATIONS

This application is a Continuation of U.S. application Ser. No. 13/384,966 (National Stage of PCT/JP2011/072058), filed Jan. 19, 2012, incorporated herein by reference in its entirety.

TECHNICAL FIELD

The present invention relates to a computing device system and information managing method. For example, the present invention relates to a technique of managing layers of a storage volume pool in a storage system.

BACKGROUND ART

Recently, a technique called "thin provisioning" (for example, see Patent Literature 1) has been actively used in a storage system. Here, the thin provisioning denotes a technique of assigning a virtual volume (or virtual logical volume) to a host computing device. Also, the virtual volume denotes a volume to which an actual data storage area on a physical disk (hereinafter referred to as "page") is assigned from a pooled logical volume (hereinafter referred to as "pool volume") at the time when the host computing device writes data in the virtual volume.

Also, as disclosed in Patent Literature 2, depending on the I/O volume from a host computing device for a page assigned to a virtual volume, the page is operated to be moved from a pool volume storing the page to a different pool volume of different performance and cost (rearrangement processing). That is, a storage apparatus records the I/O count for each page comprising a virtual volume (hereinafter execution of this recording is referred to as "I/O monitoring") and determines a page arrangement destination layer (i.e., a pool volume classified by performance and cost) depending on the I/O count. For example, a page of a larger I/O count is preferentially arranged in a higher layer (i.e., pool volume of high performance and high cost).

CITATION LIST

Patent Literature

Patent Literature 1: JP Patent Publication (Kokai) No. 2003-15915 A

Patent Literature 2: JP Patent Publication (Kokai) No. 2007-66259 A

SUMMARY OF INVENTION

Technical Problem

However, a storage apparatus does not recognize what a task on a host computing device actually issuing I/O's is, and therefore the storage apparatus records all I/O's for each page comprising a virtual volume. Consequently, for example, in a case where the I/O count of tasks not requiring a high response is temporarily high, the I/O count for a page group storing data of tasks requiring a high response is relatively smaller than the I/O count for a page group storing data of tasks not requiring a high response, and, as a result, there is a possibility that the page group storing data of tasks requiring a high response is arranged in a lower layer, which degrades the performance.

In view of the above situation, therefore, the present invention provides a technique of: suitably configuring decision criteria for determining a destination layer in rearrangement processing according to a task type and operating status; and preventing performance degradation caused by arranging data of tasks requiring a high response in a lower layer.

Solution to Problem

To solve the above problem, a computing device system of the present invention has at least one storage subsystem (i.e., storage apparatus) and a plurality of computing devices connected to the storage subsystem. Here, the storage subsystem has: a plurality of physical storage devices of different response performance; a memory storing virtual volume management information associating a pool including actual storage areas of the physical storage devices with at least one virtual logical volume comprising the pool; and a processor which executes processing of assigning an actual storage area included in the virtual logical volume to one of the plurality of computing devices. Further, at least one computing device (or management computing device or each host computing device) of the plurality of computing devices configures rearrangement reference information showing whether an access characteristic related to a task executed on the plurality of computing devices is considered as a decision criterion for transfer destination determination in rearrangement processing of transferring data between the actual storage areas of the plurality of physical storage devices of different response performance. Further, the storage subsystem refers to the rearrangement reference information and, based on an access characteristic of the plurality of computing devices with respect to the actual storage areas assigned to the plurality of computing devices, executes rearrangement processing of transferring data stored in the actual storage areas to different actual storage areas in the physical storage devices of different response performance.

A further feature related to the present invention is clarified in the description of the present specification and the attached drawings. Also, an aspect of the present invention is realized by components, combinations of the components, the following detailed description and aspects of the attached claims.

The description of the present specification is merely a typical example and needs to be understood that it does not limit the claims or applicable examples of the present invention in any meanings.

Advantageous Effects of Invention

According to an embodiment of the present invention, by controlling whether it is a rearrangement processing target or not (ON/OFF of an I/O monitoring) according to a type and operating status of a task on a host, it is possible to prevent performance degradation caused by arranging data of tasks requiring a high response in a lower layer. Further, the user can easily decide which task is set as a rearrangement processing target (i.e. to which task's I/O monitoring the ON/OFF control is applied).

BRIEF DESCRIPTION OF DRAWINGS

FIG. 9 is a view showing a configuration example of a virtual volume management table according to the embodiment of the present invention.

FIG. 10 is a view showing configuration example of a volume pool management table according to the embodiment of the present invention.

FIG. 11 is a view showing a configuration example of a pool layer management table according to the embodiment of the present invention.

FIG. 12 is a view showing a configuration example of an unused area management table according to the embodiment of the present invention.

FIG. 13 is a view showing a configuration example of a virtual volume I/O monitoring ON/OFF management table according to Embodiment 1 of the present invention.

FIG. 16 is a view showing a configuration example of a rearrangement page management table according to the embodiment of the present invention.

FIG. 17 is a view showing a configuration example of a host volume management table according to the embodiment of the present invention.

FIG. 18 is a view showing a configuration example of an I/O monitoring necessity/unnecessity management table according to the embodiment of the present invention.

FIG. 22 is a view showing a configuration example of a rearrangement capacity management table according to the embodiment of the present invention.

FIG. 23 is a view showing a configuration example of a task operation information management table according to the embodiment of the present invention.

FIG. 25 is a view showing a configuration example of an I/O monitoring OFF candidate management table per task type according to the embodiment of the present invention.

DESCRIPTION OF EMBODIMENTS

Figure 1:
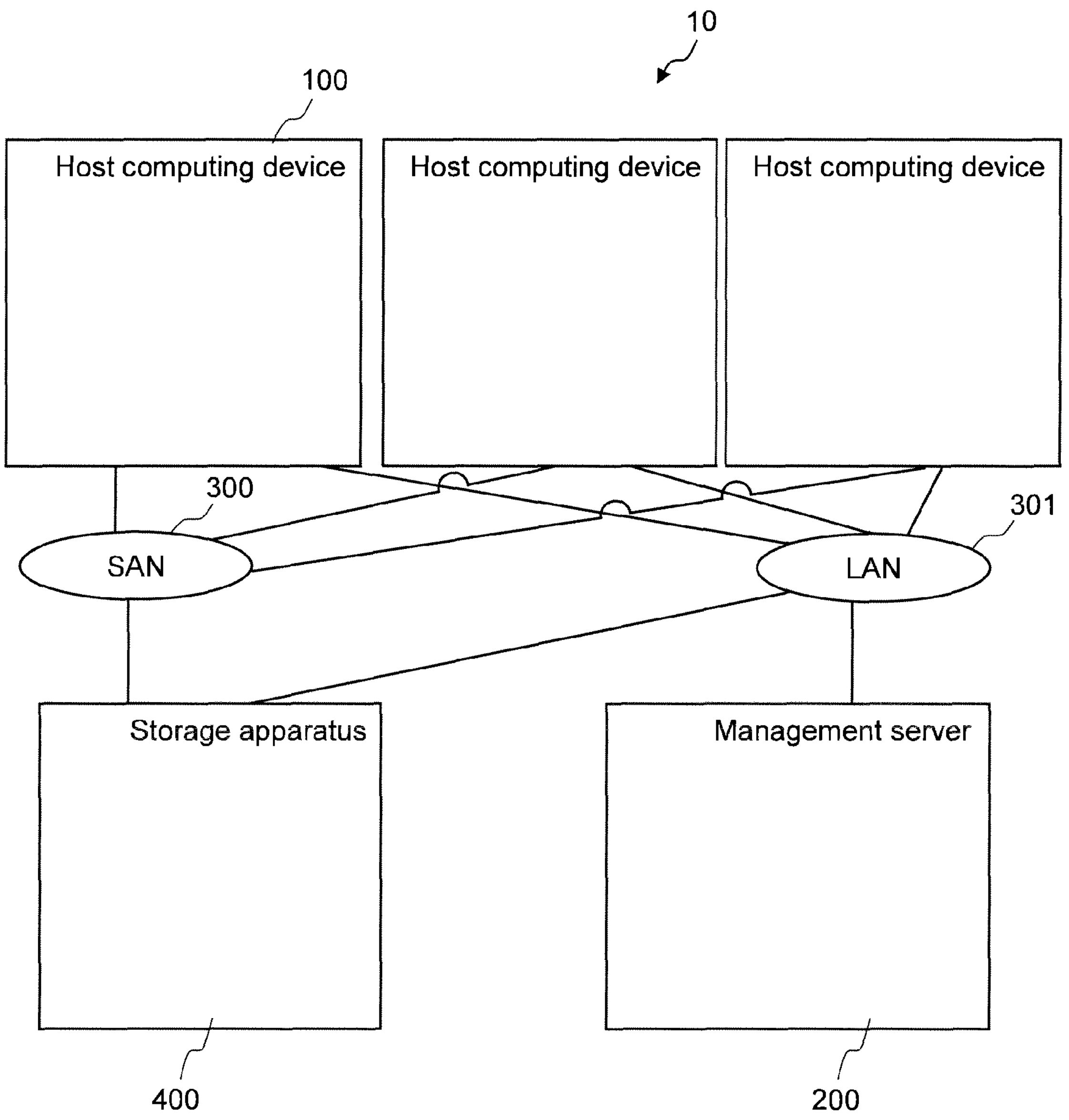
FIG. 1 is a schematic view of a computing device system (storage system) according to an embodiment of the present invention.
Figure 2:
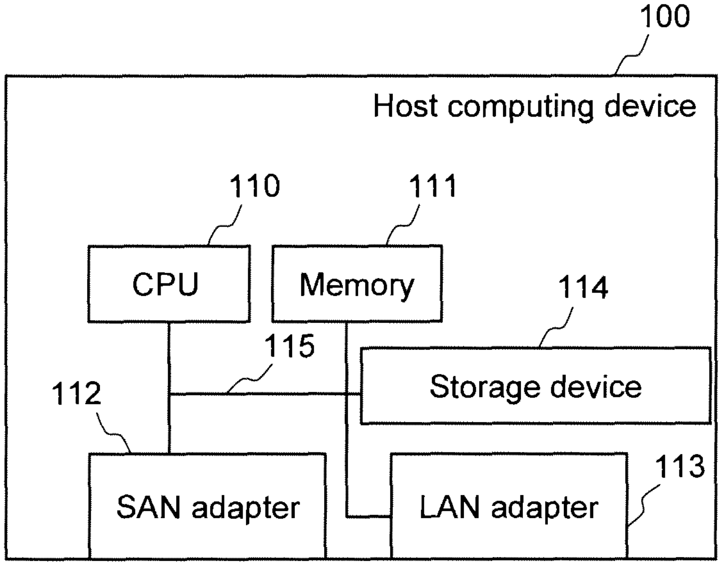
FIG. 2 is a view showing a configuration example of a hardware system of a host computing device and management server according to the examples of the present invention.
Figure 2:
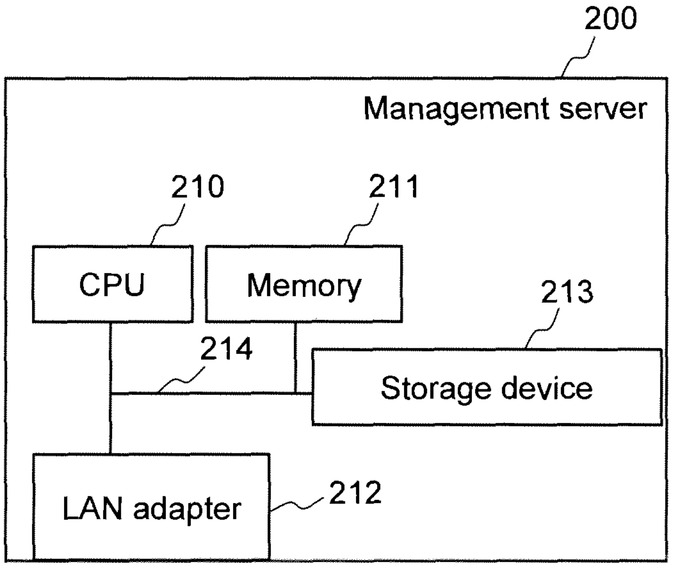

Embodiments of the present invention will be explained below with reference to the attached drawings. In the attached drawings, components of the same function may be shown by the same number. It should be noted that, although the attached drawings show detailed embodiments and implementation examples according to the principle of the present invention, these are used to understand the present invention and are not used to interpret the present invention in a limited way.

Although the present embodiments contain sufficient description to an extent that those skilled in the art can implement the present invention, it is essential to understand that other implementations and modes are possible and it is possible to change the configuration and structure or replace various components without deviating the scope and spirit of the technical idea of the present invention. Therefore, the following description should not be interpreted in a limited way.

Further, as described below, embodiments of the present invention may be implemented by software operating on a general-purpose computer, dedicated hardware or a combination of software and hardware.

It should be noted that, although each piece of the information of the present invention will be explained below in a "table" format, these items of the information need not be necessarily represented by a data structure in a table format and may be represented by a list, DB, queue or other data structures. Therefore, to show that the information does not depend on a data structure, "table," "list," "DB" and "queue" may be simply referred to as "information."

Also, upon explaining the content of each piece of the infatuation, it is possible to use expression of "identification information," "identifier," "name," "appellation" and "ID" and replace these with each other.

In the following, although each processing in the embodiments of the present invention will be explained using a "program" as the subject (i.e., operation subject), determined processing is carried out using a memory and communication port (i.e., communication control apparatus) by executing the program in a processor, and therefore the processor may be used as the subject in the explanation. Also, disclosed processing using a program as the subject may be processing executed by a computing device or information processing apparatus such as a management server. Part of or all of the programs may be executed in hardware or modularized. Various programs may be installed in each computing device by a program distribution server or storage medium.

Each embodiment of the present invention provides a technique of controlling ON/OFF of an I/O monitoring according to a task type and operating status and then preventing performance degradation caused by arranging data of tasks requiring a high response in a lower layer. Also, each embodiment presents effective information to the user to decide in which task the I/O monitoring ON/OFF control is required.

(1) Embodiment 1

Embodiment 1 of the present invention will be explained based on FIGS. 1 to 26 and 32.

<Computing Device System and Configuration>

FIG. 1 is a block diagram showing the entire outline of a computing device system (or referred to as "storage system" or "IT system") according to the embodiment of the present invention.

A computing device system 10 has at least one host computing device (or simply referred to as "host") 100, at least one management server (or simply referred to as "management computing device") 200 and at least one storage apparatus (or referred to as "storage subsystem") 400, where these components are connected to each other via a LAN 301. Also, the storage apparatus 400 and the host computing device 100 are connected to each other via a SAN 300. It should be noted that a plurality of host computing devices may be provided, and, in this case, they may be connected to each other via a data transfer LAN in addition to the LAN 301.

<Internal Configuration of Host Computing Device>

FIG. 2A is a view showing an internal configuration of the host computing device 100. The host computing device 100 has at least one CPU 110, at least one memory 111, at least one SAN adapter 112, at least one LAN adapter 113 and at least one storage device 114, where they are connected to each other via an internal bus 115.

The host computing device 100 is connected to the storage apparatus 400 via the SAN adapter 112. Also, the host computing device 100 is connected to the management server 200 via the LAN adapter 113. It should be noted that the storage device 114 needs not be necessarily provided. In a case where the storage device 114 is not provided, a volume in the storage device 400 may be used as a software memory area.

<Internal Configuration of Management Server>

FIG. 2B is a view showing an internal configuration of the management server 200. The internal configuration of the management server 200 is similar to that of the host computing device 100 but does not necessarily have a SAN adapter.

The management server 200 is connected to the storage apparatus 400 and the host computing device 100 via a LAN adapter 212.

<Internal Configuration of Storage Apparatus>

Figure 3:
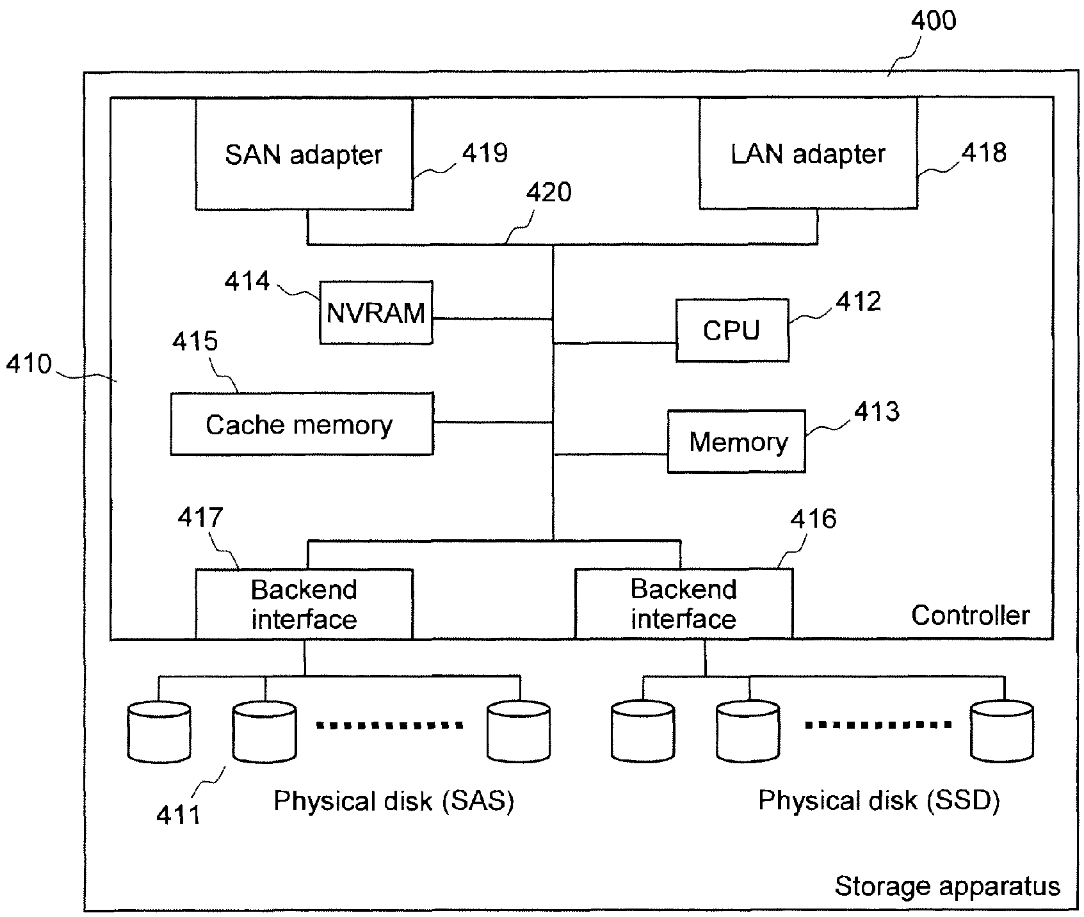
FIG. 3 is a view showing a hardware system configuration example of a storage apparatus according to the embodiment of the present invention.

FIG. 3 is a view showing an internal configuration of the storage apparatus 400. The storage apparatus 400 has at least one controller 410 and at least one physical disk 411.

The controller 410 has at least one CPU 412, at least one memory 413, at least one NVRAM 414, at least one cache memory 415, at least one backend interfaces 416 and 417, at least one LAN adapter 418 and at least one SAN adapter 419, where these components are connected to each other via an internal bus 420.

The controller 410 is connected to the physical disk 411 via the backend interfaces 416 and the 417. Also, the storage apparatus 400 is connected to the management server 200 via the LAN adapter 418. Also, the storage apparatus 400 is connected to the host computing device 100 via the SAN adapter 419. Also, the physical disk 411 may comprise multiple kinds of disks such as an SAS (Serial Attached SCSI (Small Computer System Interface)) disk, an SATA (Serial Advanced Technology Attachment) disk and an SSD (Solid State Drive).

<Software Configuration of Computing Device System>

Figure 4:
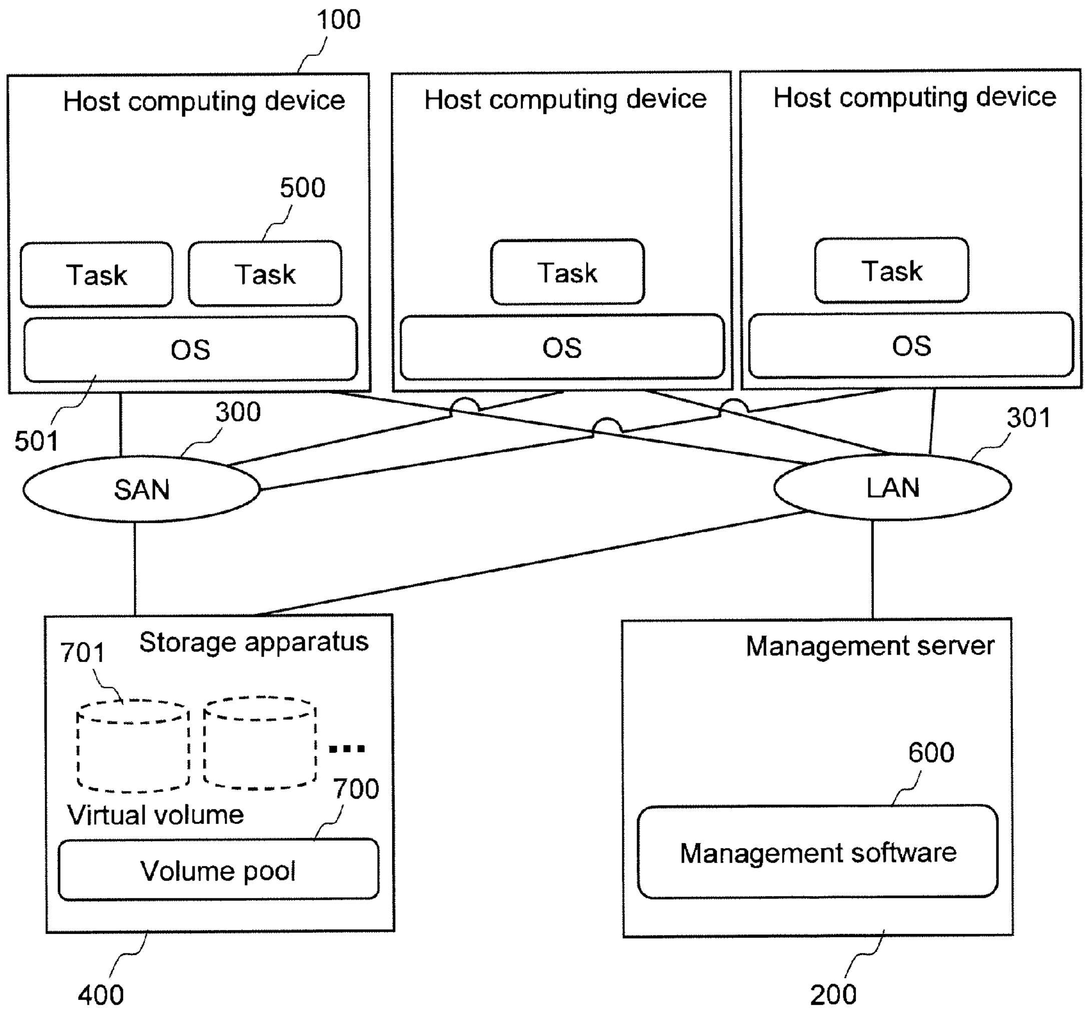
FIG. 4 is a view showing a software system configuration example of the computing device system according to the embodiment of the present invention.

FIG. 4 is a block diagram showing the outline of a software configuration of the computing device system 10 according to the present embodiment. On the host computing device 100, at least one task 500 by certain application and at least one OS (Operating System) 501 are operated. This software is stored in the storage device 114 or the storage apparatus 400, loaded into the memory 110 and executed using the CPU 110.

Also, on the management server 200, management software 600 is operated. The management software 600 is loaded into a memory 211 and executed using a CPU 210.

Further, on the storage apparatus 400, there is at least one volume pool 700 and at least one virtual volume 701 to be created from the volume pool 700 (described later). The virtual volume 701 is assigned to the host computing device 100 via the SAN 300. It should be noted that the present system configuration may include a logical volume (i.e., actual volume, which is described later) together with the virtual volume 701.

The OS 501 manages and executes the multiple tasks 500 and recognizes and manages the virtual volume 701 and the logical volume 702.

The management software 600 obtains configuration information from the host computing device 100 and the storage system 400 and stores it a management table. The management software 600 will be described later in detail.

<Software Configuration of Storage Apparatus>

Figure 5:
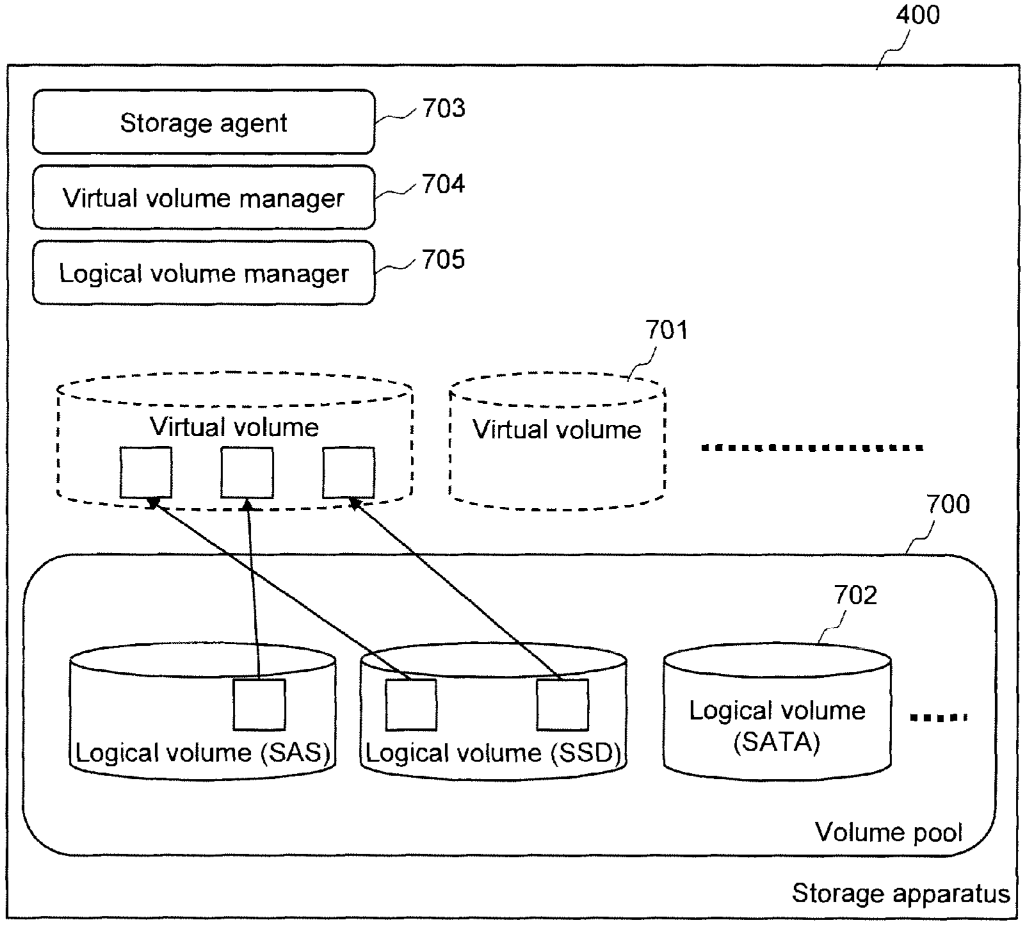
FIG. 5 is a view showing a software system configuration example of the storage apparatus according to the embodiment of the present invention.

FIG. 5 is a view showing the outline of a software configuration in the storage apparatus 400. On the storage apparatus 400, a storage agent 703, a virtual volume manager 704 and a logical volume manager 705 are operated. These are stored in the physical disk 411 or the NVRAM 414, loaded into the memory 413 and executed using the CPU 412.

The logical volume manager 705 denotes software for creating at least one logical volume 702 from the physical disk 411 and managing mapping between the logical volume 702 and the physical disk 411.

The virtual volume manager 704 denotes software for creating at least one virtual volume 701 from the logical volume 702 registered in the volume pool 700 and managing mapping between the virtual volume 701 and the logical volume 702.

The virtual volume manager 704 denotes software for assigning, when data is written in the virtual volume 701, an unused area from the logical volume 702 to a place in which the data is written in the virtual volume 701.

<Relationship Between Logical Volume and Physical Disk>

Figures 6, 7:
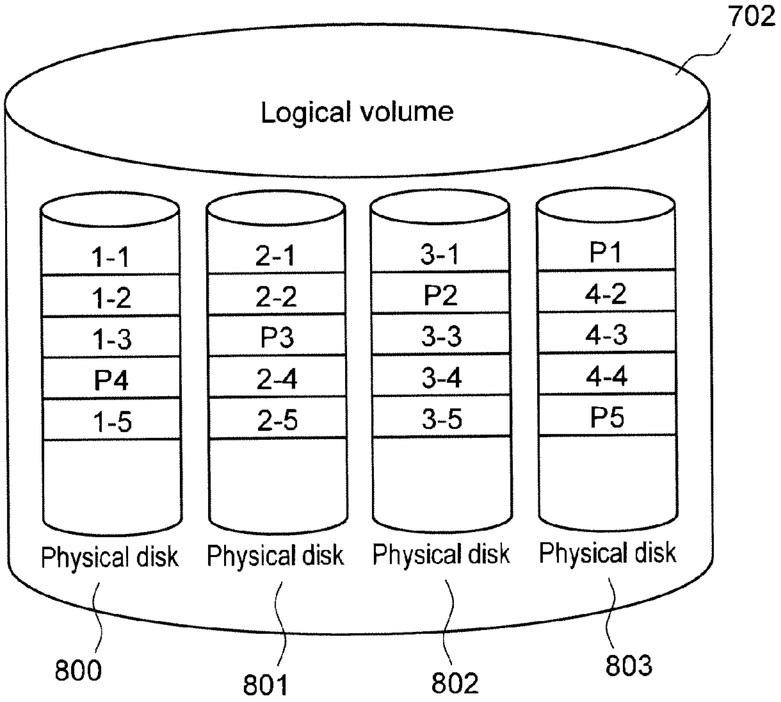
FIG. 6 is a conceptual view showing a relationship example between a logical volume and physical disks according to the embodiment of the present invention.
FIG. 7 is a view showing a configuration example of a logical volume management table according to the embodiment of the present invention.

FIG. 6 is a schematic view showing a relationship between the logical volume 702 and the physical disk 411. In the example of FIG. 6, the logical volume 702 is supposed to comprise four physical disks 800, 801, 802 and 803. The areas labeled with "1-1," "1-2," "1-3," and so on, in the physical disks, denote areas divided in predetermined sizes and are called "stripes." Also, the areas labeled "P1," "P2," and so on, denote areas storing parity information of corresponding strips and are called "parity stripes."

A volume management table is held in the storage apparatus 400 such that the logical volume manager 705 manages the mapping relationship between the logical volume 702 and the physical disk 411. The volume management table will be described later in detail.

<Volume Management Table>

FIG. 7 is a view showing a configuration example of the volume management table 900 held in the storage apparatus 400. The volume management table comprises a logical volume ID sequence 900, a disk sequence 901, a RAID level sequence 902, a stripe size sequence 903 and a disk type sequence 904.

In the logical volume sequence ID 900, the logical volume manager 705 is assigned to each volume and identifiers (i.e., identification information) to specify/identify respective volumes are registered.

In the disk sequence 901, identifiers (i.e., identification information) to specify/identify the physical disks comprising the logical volume are registered.

In the RAID level sequence 902, RAID levels used in the logical volume configurations are registered.

In the stripe size sequence, stripe sizes used in the logical volume configurations are registered.

In the disk type sequence 904, types of physical disks comprising the logical volume are registered.

<Relationship Between Virtual Volume and Logical Volume>

Figure 8:
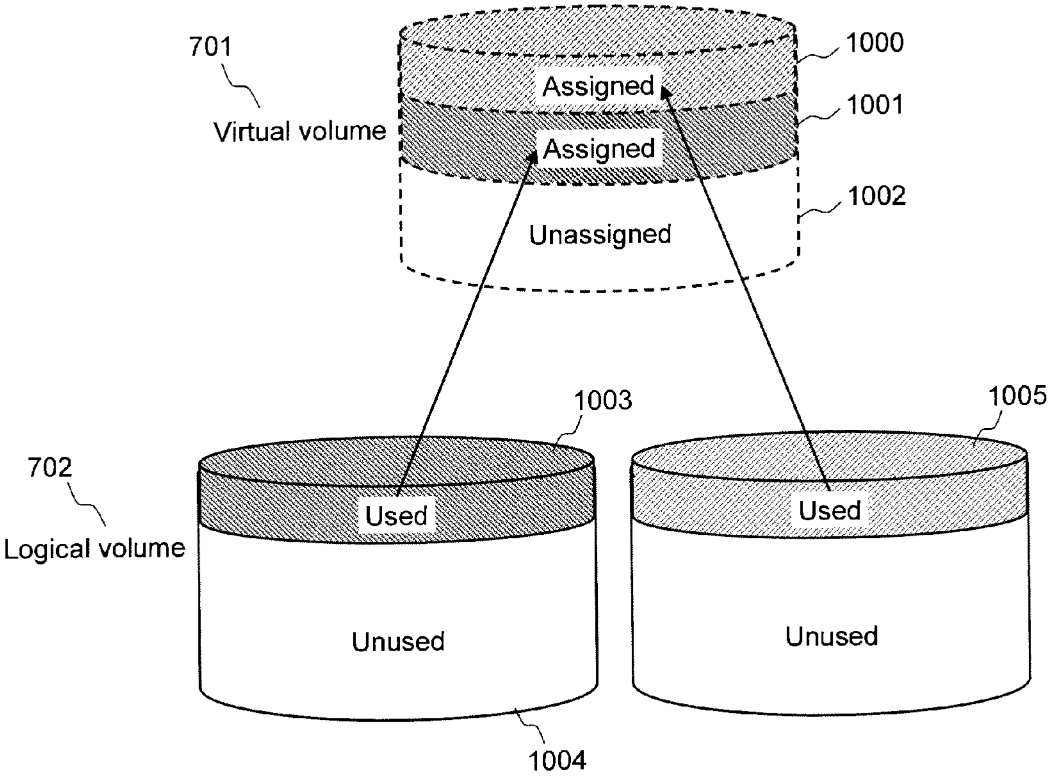
FIG. 8 is a conceptual view showing a relationship example between a virtual volume and the logical volume according to the embodiment of the present invention.

FIG. 8 is a conceptual view showing a relationship between the virtual volume 701 and the logical volume 702. In many cases, an area assignment to a virtual volume does not mean to assign a physical disk directly thereto but means to comprise a logical volume as shown in FIG. 8 and then assign a partial area of the virtual volume thereto.

Also, the virtual volume manager 704 (in FIG. 5) manages a relationship between the virtual volume 701 and the logical volume 702 included in the volume pool 700, and a layer and use status of the logical volume 702 in the volume pool. Therefore, a virtual volume management table 1100, a volume pool management table 1200, a pool layer management table 1300 and an unused area management table 1400 are held in the storage apparatus 400. It should be noted that the virtual volume management table 1100, the volume pool management table 1200, the pool layer management table 1300 and the unused area management table 1400 will be described later in detail.

<Configuration Example of Virtual Volume Management Table>

FIG. 9 is a view showing a configuration example of the virtual volume management table 1100 held in the storage apparatus 400. The virtual volume management table 1100 comprises a virtual volume ID sequence 1101, a start LBA sequence 1102, an end LBA sequence 1103, a pool ID sequence 1104 and a page ID sequence 1105.

The virtual volume ID sequence 1101 registers identifiers (i.e., identification information) which are attached to virtual volumes and specify/identify them.

The start LBA sequence 1102 registers a start LBA's of areas in virtual volumes. The end LBA sequence 1103 registers an end LBA's of the areas in the virtual volumes.

The pool ID sequence 1104 registers identifiers (i.e., identification information) to specify/identify a volume pool that assigns areas to a virtual volume.

The page ID sequence 1105 registers identifiers (i.e., identification information) to specify/identify pages (described later) corresponding to areas (specified by the start LBA's and end LBA's) of a virtual volume.

<Volume Pool Management Table>

FIG. 10 is a view showing a configuration example of the volume pool management table 1200 held in the storage apparatus 400.

The volume pool management table 1200 comprises a pool ID sequence 1201, a page ID sequence 1202, a logical volume ID sequence 1203, a start LBA sequence 1204, an end LBA sequence 1205 and a storage I/O count sequence 1206.

The pool ID sequence 1201 registers identifiers (i.e., identification information) which are attached to volume pools and specify/identify them.

The page ID sequence 1202 registers identifiers (i.e., identification information) which are attached to pages and specify/identify them. It should be noted that the page is a unit of area assigned from the volume pool 700 to the virtual volume 701. Each page is assigned to any of the logical volume.

The logical volume ID sequence 1203 registers identifiers (i.e., identification information) to specify/identify logical volumes in page assignment destination.

The start LBA sequence 1204 registers a start LBA's of pages in logical volumes. Also, the end LBA sequence 1205 registers an end LBA's of the pages in the logical volumes. It is possible to know the page size of each page by the start LBA's and end LBA's. Generally, a page size is fixed, but, by appropriately configuring start and end LBAs', it is possible to register pages of different sizes.

The storage I/O count sequence 1206 records the I/O count issued to each page. In FIG. 10, it is configured that the I/O count is not necessary in a pool 2, and therefore the I/O counts 1206 in the pool 2 are all "0." The storage I/O count 1206 will be described later in detail.

<Pool Layer Management Table>

FIG. 11 is a view showing a configuration example of the pool layer management table 1300 held in the storage apparatus 400.

The pool layer management table 1300 comprises a pool ID sequence 1301, a layer sequence 1302 and a logical volume ID sequence 1303.

The pool ID sequence 1301 registers identifiers (i.e., identification information) to specify/identify volume pools.

The layer sequence 1302 registers layers configured in volume pools. It should be noted that a layer is determined based on a disk type or RAID level of a logical volume but may be defined by the user.

The logical volume ID sequence 1303 registers identifiers (i.e., identification information) to specify/identify logical volumes belonging to respective layers.

As seen from FIG. 11, for example, a pool 1 comprises two layers of Tier0 and Tier1, Tier0 comprises logical volumes 1 and 2 and Tier1 includes logical volumes 0 and 3.

<Unused Area Management Table>

FIG. 12 is a view showing a configuration example of the unused area management table 1400 held in the storage apparatus 400.

The unused area management table 1400 denotes a table for managing unused areas in logical volumes, and comprises a logical volume ID sequence 1401, a start LBA sequence 1402 and an end LBA sequence 1403.

The logical volume ID sequence 1401 registers identifiers (i.e., identification information) to specify/identify logical volumes registered in the volume pool 700.

The start LBA sequence 1402 and the end LBA sequence 1403 register start LBA and end LBA sequences of an unused area 1004 in the logical volume 702, respectively.

Normally, although logical volume areas are assigned to logical volumes in order of address and then used, a used volume may be released and then becomes an unused area. Therefore, as shown in FIG. 12, unused areas may be discontinuous.

<Virtual Volume I/O Monitoring ON/OFF Management Table>

The virtual volume manager 704 records the I/O count (i.e., storage I/O count) issued for pages comprising the virtual volume 701, determines a layer of page arrangement destination regularly based on the recorded storage I/O count and transfers the pages. In the present specification, to record the storage I/O count is referred to as "I/O monitoring," and to determine a layer of page arrangement destination and transfer the page is referred to as "page layer rearrangement (or rearrangement processing)."

For I/O monitoring and page layer rearrangement, the virtual volume manager 704 refers to the above-noted virtual volume management table 1100, volume pool management table 1200, pool layer management table 1300, unused area management table 1400, in addition to a virtual volume I/O monitoring ON/OFF management table held in the storage apparatus 400.

FIG. 13 is a view showing a configuration example of a virtual volume I/O monitoring ON/OFF management table 1500.

The virtual volume I/O monitoring ON/OFF management table 1500 comprises a virtual volume ID sequence 1501 and an I/O monitoring ON/OFF sequence 1502.

The virtual volume ID sequence 1501 registers identifiers (i.e., identification information) to specify/identify virtual volumes.

The I/O monitoring ON/OFF sequence 1502 registers whether the I/O count for the corresponding virtual volume upon I/O monitoring processing is recorded (ON) or not (OFF). It should be noted that, regarding information of this I/O monitoring ON/OFF 1502, although a default value is configured as the initial value, the value (ON/OFF) changes according to processing in FIG. 19 (described later) as the system operates sequentially.

<I/O Monitoring Processing>

Figure 14:
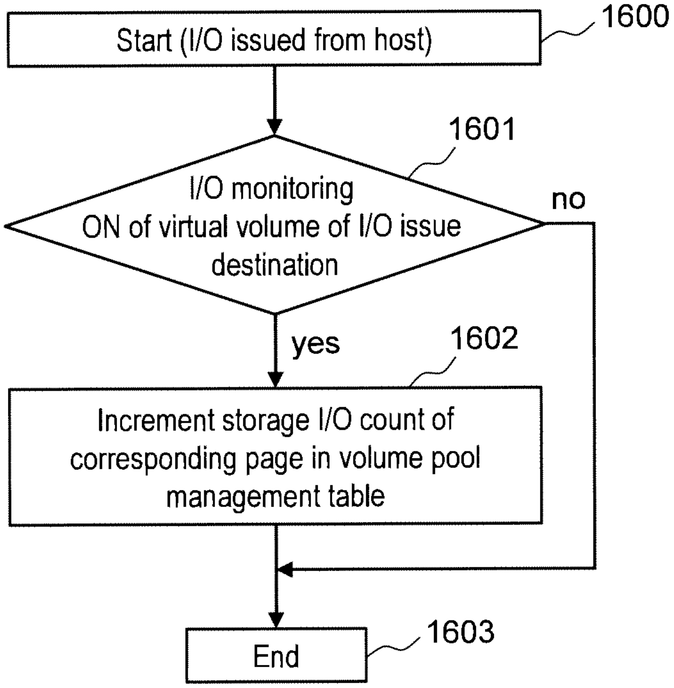
FIG. 14 is a flowchart for explaining I/O monitoring processing according to Embodiment 1 of the present invention.

FIG. 14 is a flowchart for explaining I/O monitoring processing carried out by the virtual volume manager 704. The present processing is started by issuing an I/O from the host computing device 100 to the virtual volume 701 in the storage apparatus 400 (step 1600). Each step explanation will be described below.

Step 1601: The virtual volume manager 704 refers to the virtual volume I/O monitoring ON/OFF management table 1500 and checks whether the virtual volume I/O monitoring of the I/O issue destination is in the "ON" condition. In the case of "ON" (i.e., "Yes" in step 1601), the process proceeds to step 1602. In the case of "OFF" (i.e., "No" in step 1601), the process ends (step 1603).

Step 1602: The virtual volume manager 704 increments, by one, the number of the storage I/O count sequence 1206 in a line determined by the page ID of I/O issue destination page and the pool ID of a volume pool in the volume pool management table 1200.

It should be noted that, in order to obtain the latest trend of the storage I/O count, although the storage I/O count sequence 1206 is rest to "0" at regular time intervals, at this time, the storage I/O count before the reset may be held as history. In this case, the volume pool management table 1200 holds time zone information recording the storage I/O count. That is, in this case, the volume management table 1200 is as shown in FIG. 23.

Also, the I/O monitoring ON/OFF may be carried out in WWN units of identifiers of the SAN adapter 112 of the host computing device 100 instead of virtual volume units. In this case, in step 1601, instead of the virtual volume I/O monitoring ON/OFF management table 1500, by using the virtual volume I/O monitoring ON/OFF management table 1500 replacing the virtual volume ID sequence 1501 with a host WWN sequence, it is determined by the I/O issue source WWN whether there is an I/O record. That is, the I/O count of the I/O issue source is counted.

<Page Layer Rearrangement Processing>

Figure 15:
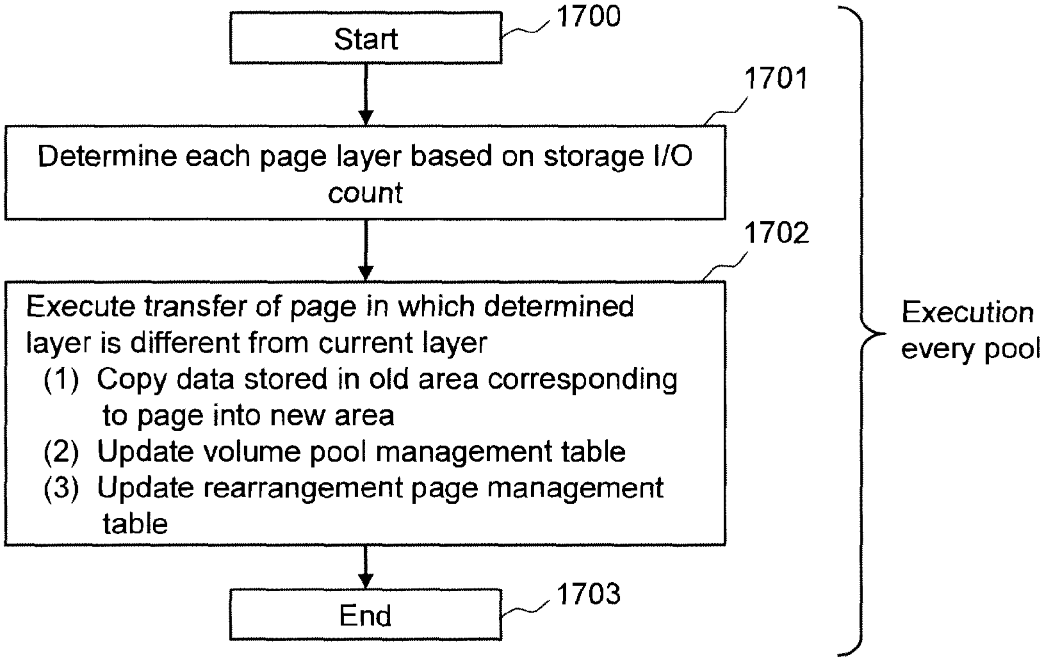
FIG. 15 is a flowchart for explaining page layer rearrangement processing according to the embodiment of the present invention.

FIG. 15 is a flowchart for explaining page layer rearrangement processing carried out by the virtual volume manager 704. The present processing is carried out for each volume pool, started after the elapse of a certain period of time or started by the user's manual operation (step 1700). Each step explanation will be described below.

Step 1701: The virtual volume manager 704 determines the arrangement destination layer of each page based on the storage I/O count of each page recorded in the storage I/O count sequence 1206 of the volume pool management table 1200.

For example, the arrangement destination layer determination method may be a method of allocating arrangement destination of higher layers to pages of larger storage I/O counts in order or a method of allocating arrangement destination of lower layers to pages of smaller storage I/O counts in order. Also, it is possible to determine the arrangement destination layer of each page taking into account not only the latest record recorded as a storage I/O count in the storage I/O count sequence 1206 but also a past storage I/O count history, or it is possible to determine the arrangement destination layer of each page using not only the storage I/O count but also other indices. In the case of taking into account the history, the average value of I/O counts for the past several hours are required. By taking into account the history in this way, although the I/O count increases instantaneously, it is possible not to carry out rearrangement in a case where the I/O count is hardly counted in other periods (or time zone).

Further, for example, it is equally possible to determine the arrangement destination layer taking into account only the read count instead of taking into account the sum value (i.e., storage I/O count) of read/write counts from the host computing device 100. Also, it is equally possible to determine the arrangement destination layer taking into account indices such as the random access count and the sequential read count. The I/O count, the random access count, the sequential read count, and so on, can be collectively referred to as "access property" or "access characteristic."

It should be noted that even a page of a virtual volume configured to be in the monitoring OFF condition is the rearrangement processing target. Regarding the page, the I/O count is zero, and therefore the page may be transferred to a lower layer.

Step 1702: The virtual volume manager 704 carries out page transfer (i.e., rearrangement) based on the layer arrangement of each page determined in step 1701. In this case, the transfer target is only a page in which the determined layer and the currently-arranged layer are different. It should be noted that the layer in which each page is currently arranged can be checked from a combination of the volume pool management table 1200 and the pool layer management table 1300.

The page transfer is formed with following three transaction processings for each page. That is, they include: (i) data of a logical volume area (i.e., old area) in which the page is currently arranged is copied to an unused area (i.e., new area)

of a logical volume belonging to a determined layer; (ii) the logical volume ID sequence 1203, start LBA sequence 1204 and end LBA sequence 1205 of the volume pool management table 1200 are updated with new area values; and (iii) a rearrangement page management table (described later in detail) is updated. After processings (i) to (iii) are applied to all transfer target pages, the process ends (step 1703).

<Rearrangement Page Management Table>

FIG. 16 is a view showing a configuration example of a rearrangement page management table 1800 held in the storage apparatus 400.

The rearrangement page management table 1800 denotes a table of holding transfer history information of pages transferred to layers in the page layer rearrangement processing, and comprises a pool ID sequence 1801, a page ID sequence 1802, a transfer original layer 1803 and a transfer destination layer 1804.

The pool ID sequence registers identifiers (i.e., identification information) to specify/identify volume pools.

The page ID sequence registers identifiers (i.e., identification information) to specify/identify pages transferred to layers in the page layer rearrangement processing.

The transfer original layer sequence 1803 and the transfer destination layer sequence 1804 record page arrangement destination layers before/after the page layer rearrangement processing, respectively. The transfer destination layer 1804 becomes the transfer original layer 1803 at the time of the next rearrangement processing.

It should be noted that the rearrangement page management table 1800 may hold not only the record of page layer rearrangement processing that is carried out immediately previously but also a history of past page layer rearrangement processing. In this case, the rearrangement page management table 1800 holds the time at which the page layer rearrangement processing was carried out. Also, FIG. 16 shows only cases of upgrade or downgrade, but layers may not be changed.

<Host Volume Management Table>

The storage agent 703 attaches storage volume ID's (described later) to the logical volume 702 and the virtual volume 701 and carries out management. The logical volume 702 and the virtual volume 701 are collectively referred to as "storage volume."

FIG. 17 is a view showing a configuration example of a host volume management table 1900 held in the management server 200.

The host volume management table 1900 is created by obtaining, in the management software 600, information from the host computing device 100. The host volume management table 1900 comprises a host ID sequence 1901, a host WWN sequence 1902, a host volume ID sequence 1903 and a storage volume ID sequence 1904.

The host ID sequence 1901 registers identifiers (i.e., identification information) to specify/identify the host computing device 100, where the identifiers are attached by the management software 600.

The host WWN sequence 1902 registers identifiers (i.e., identification information) to specify/identify the SAN adapter 112 of the host computing device 100. This information can be used when monitoring the I/O count in WWN units.

The host volume ID sequence 1903 registers identifiers (i.e., identification information) to specify/identify attached volumes recognized by the host computing device 100. Hereinafter, volumes to be recognized by the host computing device 100 are referred to as "host volumes."

The storage volume ID sequence 1904 registers identifiers (i.e., identification information) to specify/identify storage volumes corresponding to host volumes. The storage volume ID denotes information attached from the storage agent 703 to each storage volume.

It should be noted that, although the storage volume ID denotes information attached and held by the storage agent 703, the OS 501 obtains the storage volume ID using, for example, an SCSI Inquiry and holds the storage volume ID, in the storage apparatus 400.

For ease of explanation, the storage volume ID in FIG. 17 is expressed by "virtual volume 0," "logical volume 3," and so on, but, in many cases, the storage agent 703 actually assigns and manages serial numbers without distinguishing between the virtual volume and the logical volume. In this case, the management software 600 obtains the correspondences between the storage volume ID, the virtual volume ID and the logical volume ID by making an inquiry to the storage agent 703. Thus, it is easily possible to specify the correspondence relationships between the storage volume ID, the virtual volume ID and the logical volume ID. Therefore, instead of describing "a virtual volume ID specified from a storage volume ID" or "a logical volume ID specified from a storage volume ID," it is possible to simply express a virtual volume ID or a logical volume ID.

Also, in FIG. 17, although host volumes and storage volumes are associated in a one-to-one correspondence, the one-to-one correspondence is not essential, and a one-to-many or many-to-one correspondence is possible.

<I/O Monitoring Necessity/Unnecessity Management Table>

FIG. 18 is a view showing a configuration example of an I/O monitoring necessity/unnecessity management table 2000 held by the management server 200 and referred to by the management software 600.

The I/O monitoring necessity/unnecessity management table 2000 includes a host ID sequence 2001, a task name sequence 2002, a task type sequence 2003 and an I/O monitoring necessity/unnecessity sequence 2004.

The host ID sequence 2001 registers identifiers (i.e., identification information) to specify/identify the host computing device 100, where the identifiers are attached by the management software 600.

The task name sequence 2002 registers names to distinguish the tasks 500 on the OS 501.

The task type sequence 2003 registers general types of the tasks 500.

The I/O monitoring necessity/unnecessity sequence 2004 registers whether the I/O count issued by each task needs to be recorded. In this information, for example, the initial values are all set to "necessity" as a default (if the monitoring necessity/unnecessity of a specific task is known from the beginning, the manager may configure "necessity" or "unnecessity"), and, as the computing device system 10 is operated, the user (i.e. manager) may make a decision based on the display shown in FIG. 21 (described later) or processing in FIG. 24 or 26 (described later) may be carried out to automatically determine the monitoring necessity/unnecessity as "unnecessity."

It should be noted that the I/O monitoring necessity/unnecessity management table 2000 may be created by the user by making an input in the management software 600 or automatically created by the management software 600 by detecting the tasks 500 operating on the OS 501. The I/O monitoring necessity/unnecessity management table 2000 is created before the I/O monitoring ON/OFF control processing.

Generally, although night summary batch processing is likely not to require a monitoring, the batch processing is not always completed on time, and therefore the monitoring may be required. For example, in batch processing, in a case where the access count for volumes is large and the end estimation time may be delayed, it is inconvenient if pages are still arranged in layers of slow access speed. In this case, it is efficient to make a monitoring to allow rearrangement processing. In this way, there is a case where tasks not requiring an I/O monitoring are not necessarily clear on the surface, and therefore the processing of the present invention is very effective.

<I/O Monitoring ON/OFF Control Processing>

Figures 19, 20:
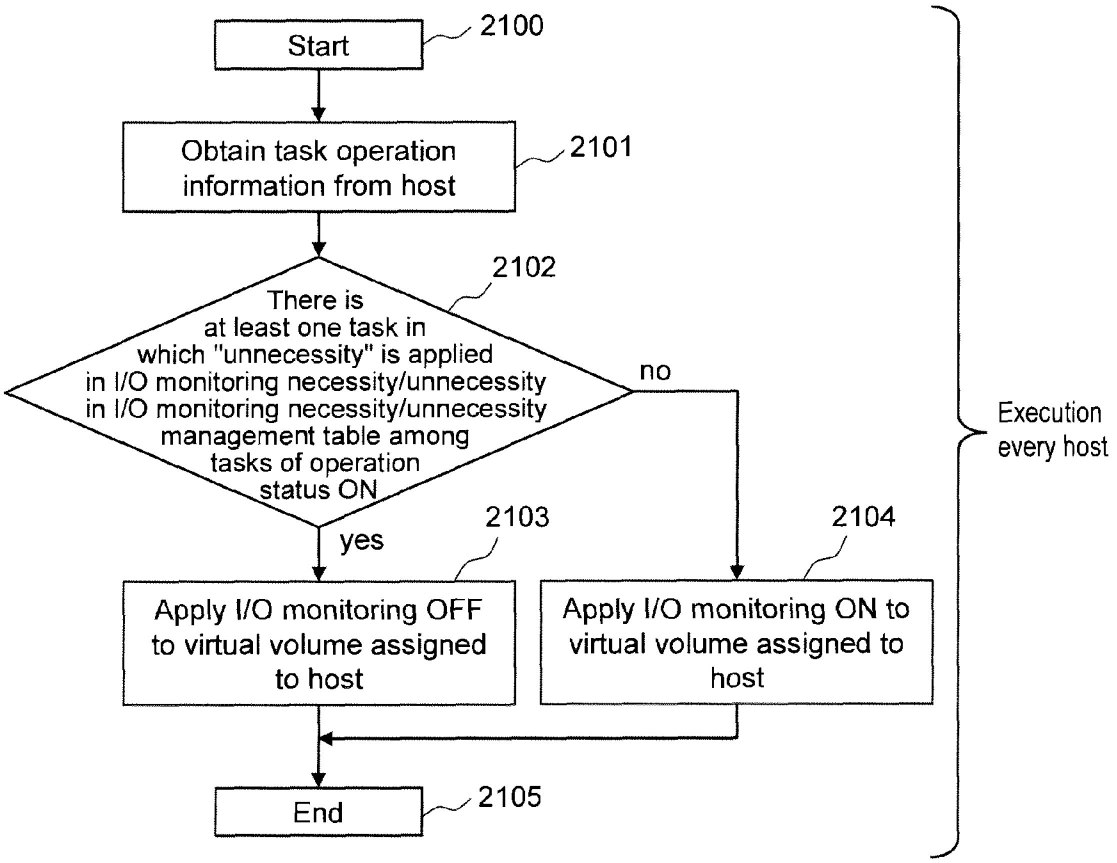
FIG. 19 is a flowchart for explaining I/O monitoring ON/OFF control processing according to Embodiment 1 of the present invention.
FIG. 20 is a view showing a configuration example of task operation information according to the embodiment of the present invention.

FIG. 19 is a flowchart for explaining I/O monitoring ON/OFF control processing (example) carried out by the management software 600 in the management server 200. The present processing is regularly executed every host (step 2100). Here, the phrase "regularly executed" means periodic execution, the startup of each task, execution on time configured by the user, and so on. That is, it means not only execution at regular intervals but also execution at arbitrarily timing. It should be noted that it may control not only the storage I/O count but also the monitoring ON/OFF of other indices. For example, instead of controlling the monitoring ON/OFF of the sum value (i.e. storage I/O count) of read/write counts from the host computing device 100, the monitoring ON/OFF of only the read count is controlled. Also, the monitoring ON/OFF of indices such as the random access count and the sequential read count is possible. That is, in the present embodiment, it is possible to control the monitoring ON/OFF of the access property or access characteristic. Regarding I/O monitoring ON/OFF control, each step explanation will be described below.

Step 2101: The management software 600 communicates with each host computing device 100 and obtains task operation information 2200 (see FIG. 20) of each host computing device 100 from the OS 501 on the host computing device 100.

Step 2102: Regarding the obtained task operation information, the management software 600 decides whether there is at least one task in which an operation status 2202 is ON and the value of the I/O monitoring necessity/unnecessity sequence 2004 is "unnecessity" in the I/O monitoring necessity/unnecessity management table 2000. This means that an I/O monitoring is "OFF" for a virtual volume in which a task not requiring an I/O-monitoring operates. It should be noted that, as the conditions of "monitoring OFF," a condition of "a host I/O issue amount 2203 equal to or greater than a threshold" is possible, instead of a condition that "the operation status 2202 is ON." Also, although "the management software 600 decides whether there is at least one task," this can be replaced with description "the management software 600 decides whether there is a task equal to or greater than a threshold (e.g., there are three tasks of "unnecessity")." Alternatively, "monitoring OFF" may be carried out only when "unnecessity" is applied to all tasks. If a decision result is "yes" in step 2102, the process proceeds to step 2103, and, if the decision result is "no," the process proceeds to step 2104.

Step 2103: The management software 600 controls the I/O monitoring of the virtual volume assigned to the host computing device 100 to "OFF." To be more specific, first, the management software 600 specifies the virtual volume ID of a virtual volume assigned to the host computing device 100 from the host volume management table 1900 (in FIG. 17) and transmits the virtual volume ID and an I/O monitoring OFF instruction to the storage apparatus 400. Then, the storage apparatus 400 having received this OFF instruction applies "OFF" to the value of the I/O monitoring ON/OFF sequence 1502 of the corresponding virtual volume ID in the virtual volume I/O monitoring ON/OFF management table 1500 (in FIG. 13).

Step 2104: The management software 600 applies "ON" to the I/O monitoring 1502 of the virtual volume assigned to the host computing device 100. To be more specific, first, the management software 600 specifies the virtual volume ID of a virtual volume assigned to the host computing device 100 from the host volume management table 1900 and transmits an I/O monitoring ON instruction including the virtual volume ID to the storage apparatus 400. Then, the storage apparatus 400 having received this ON instruction applies "ON" to the value of the I/O monitoring ON/OFF sequence 1502 of the corresponding virtual volume ID in the virtual volume I/O monitoring ON/OFF management table 1500.

<Task Operation Information>

FIG. 20 is a view showing an example of the task operation information 2200 per host computing device. The task operation information 2200 comprises a task name 2201, the operation status 2202 and the host I/O issue amount 2203.

The task name 2201 denotes information of specifying the names for distinguishing the tasks 500 on the OS 501.

The operation status 2202 denotes information representing whether each task is operated ("ON") or not ("OFF").

The host I/O issue amount 2203 denotes information representing the I/O count per time issued by each task on the OS 501.

It should be noted that the task operation information 2200 may include other information such as the memory use amount.

<I/O Monitoring ON/OFF Decision Information Display Screen (GUI)>

Figure 21:
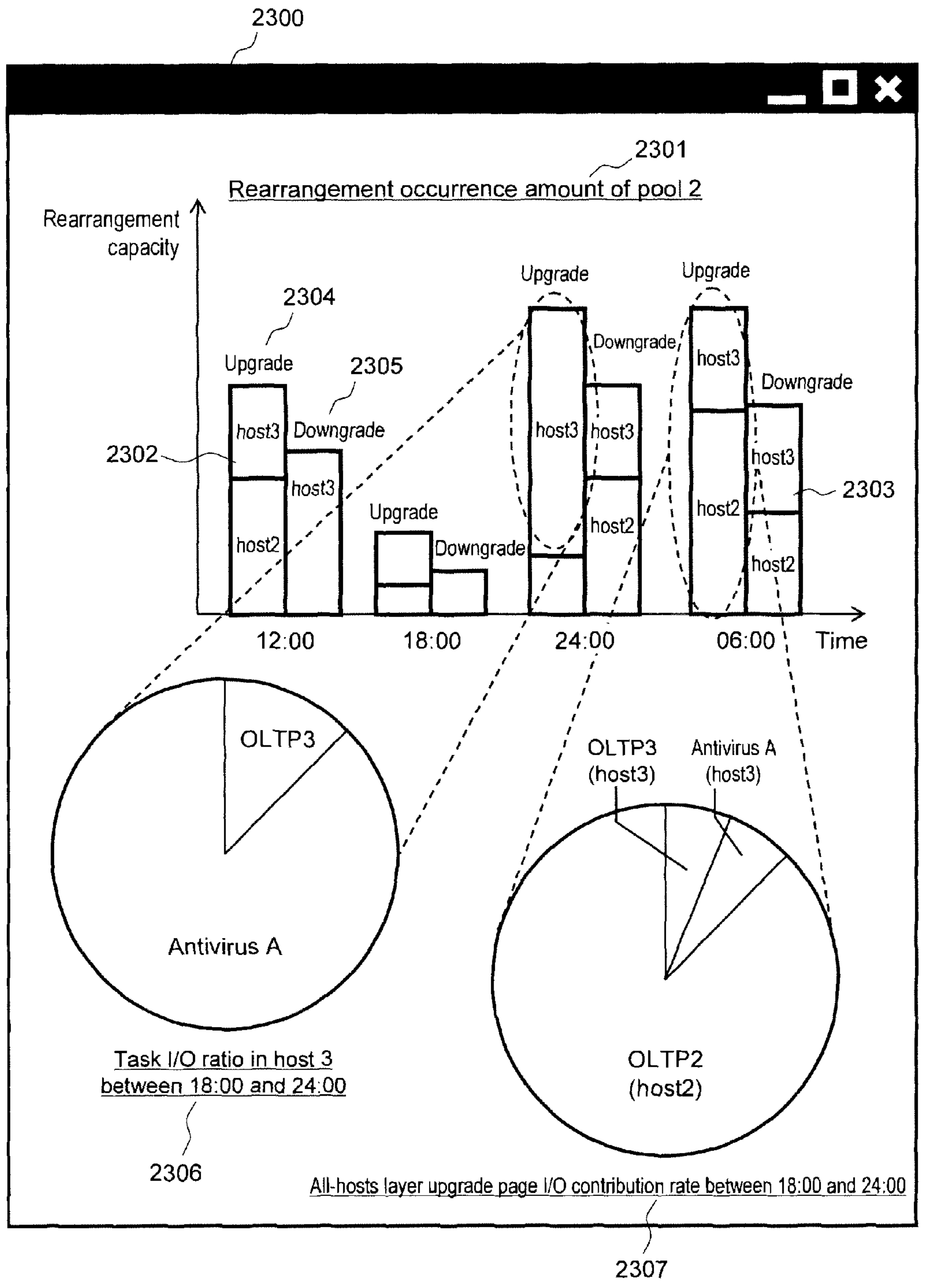
FIG. 21 is a view showing a configuration example of an information display screen for I/O monitoring ON/OFF decision according to the embodiment of the present invention.

FIG. 21 is a view showing a configuration example of an I/O monitoring ON/OFF decision information display screen 2300 displayed by the management software 600. The I/O monitoring ON/OFF decision information display screen 2300 denotes a screen used by the user for deciding to which task's I/O monitoring "OFF control" is applied upon inputting the I/O monitoring necessity/unnecessity management table 2000. FIG. 21 shows a user interface for managing the rearrangement occurrence amount per pool in the virtual volume 701. It should be noted that monitoring the rearrangement occurrence amount per pool applies to not only Embodiment 1 but also Embodiments 2 to 4.

The I/O monitoring ON/OFF decision information display screen 2300 includes three general components. That is, they are an intra-pool rearrangement occurrence amount graph 2301, an intra-host task I/O ratio graph 2306 and an all-hosts layer upgrade page I/O contribution rate graph 2307. It should be noted that, although especially upgrade (i.e., transfer from a lower layer to a higher layer) attracts attention in the intra-host task I/O ratio graph 2306 and the all-hosts layer upgrade page I/O contribution rate graph 2307 in the following description, similar graphs may be displayed by the calculation described below even for layer downgrade (i.e., transfer from a higher layer to a lower layer). Also, the calculation described below is just an example, and other calculation methods are possible as long as the user can make a similar decision to that shown below from the graphs of the intra-pool rearrangement occurrence amount graph 2301, intra-host task I/O ratio graph 2306 and all-hosts layer upgrade page I/O contribution rate graph 2307.

(i) Intra-Pool Rearrangement Occurrence Amount Graph 2301

The intra-pool rearrangement occurrence amount graph 2301 displays, for page layer rearrangement processing of the volume pool 700 in each time zone, the sum capacity (i.e., layer upgrade capacity 2304) of a layer upgrade page group (i.e., at least one page transferred from a lower layer to a higher layer) and a breakdown 2302 of the host computing device to which the page group is assigned for page layer rearrangement processing executed in each time zone. Further, regarding a layer downgrade page group (i.e., at least one page transferred from a higher layer to a lower layer), the similar information (i.e., a layer downgrade capacity 2305 and a breakdown 2303 of the host computing device to which the page group is assigned) is displayed. It is possible to decide upgrade pages or downgrade pages from the rearrangement page management table 1800 (in FIG. 16). Also, it is possible to know the LBA range of each page from the volume pool management table 1200 (in FIG. 10), so that it is possible to calculate the capacity of each page based on the LBA range. Also, it is possible to determine which page is assigned to which host computing device, by referring to the virtual volume management table 1100 (in FIG. 9), specifying a virtual volume corresponding to the page ID, referring to the host volume management table (in FIG. 17) and obtaining a host computing device to which the virtual volume ID is assigned.

The user (manager) can decide from the intra-pool rearrangement occurrence amount graph 2301 which host computing device 100 is a cause of layer upgrade and layer downgrade. Also, the intra-pool rearrangement occurrence amount graph 2301 is displayed based on a rearrangement capacity management table 2400 (see FIG. 22).

(ii) Intra-Host Task I/O Ratio Graph 2306

The intra-host task I/O ratio graph 2306 denotes, for example, a graph displayed by selecting a host computing device in a time zone to be checked (e.g., "upgrade host 3" at 24:00) on the intra-pool rearrangement occurrence graph 2301.

The intra-host task I/O ratio graph 2306 shows a "ratio of the host I/O issue amounts of tasks 500 in each host computing device 100" in a time zone in which page layer rearrangement processing is carried out.

The user can decide, from the intra-host task I/O ratio graph 2306, one of the tasks 500 which is a cause of layer upgrade of the page group corresponding to each host computing device 100, in page layer rearrangement processing in a certain time zone. As shown in FIG. 21, it is possible to recognize an antiviral A as a cause of upgrade in rearrangement processing of host 3 at 24:00.

In step 1701 of the page layer rearrangement processing, the management software 600 calculates a host I/O issue amount ratio based on the host I/O issue amount of each task 500 in a time zone in which the storage I/O count used to determine a page arrangement destination layer is recorded. For example, in step 1701, in the case of using a past storage I/O count held as a history in addition to the latest storage I/O count, the past storage I/O count is included in the above-noted calculation. However, in many cases, the past storage I/O count is less important than the latest storage I/O count as a consideration target of page rearrangement processing. Therefore, upon execution of step 1701, the virtual volume manger 704 may multiply the past storage I/O count by a certain constant (i.e., weight coefficient) to make the contribution rate lower than the latest storage I/O count. In such a case, upon calculating "the host I/O issue amount ratio of each task 500 in each host computing device 100," the management software 600 multiples the host I/O issue amount of each task in the time zone by the same coefficients by which the virtual volume manager 704 multiples the past storage I/O count in step 1701. It should be noted that a calculation of "the host I/O issue amount ratio of each task 500 in each host computing device 100" is carried out based on a task operation information management table 2500 (see FIG. 23).

Here, a calculation example of "the host I/O issue amount ratio used to display the intra-host task I/O ratio graph 2306 of host 3 on 24:00" will be simply explained using the task operation information management table 2500. For example, in page layer rearrangement processing at 24:00, it is assumed that the storage I/O count used to determine a page arrangement destination layer in step 1701 is recorded between 18:00 and 24:00 (it should be noted that the time zone in which the storage I/O count is recorded is obtained from the virtual volume manager 704). The management software 600 sums up the host I/O issue amounts between 18:00 and 24:00 for the tasks of host 3 in the task operation information management table 2500 (i.e., OLTP3 and antivirus A). The ratio of this sum value is "the host I/O issue amount ratio used to display the intra-host task I/O ratio graph 2306 of host 3 at 24:00."

(iii) all-Hosts Layer Upgrade Page I/O Contribution Rate Graph 2307

The all-hosts layer upgrade page I/O contribution rate graph 2307 denotes, for example, a graph displayed by selecting host computing devices in a time zone to be checked (e.g., "upgrade host 3" and "upgrade host 2" at 06:00) on the intra-pool rearrangement occurrence amount graph 2301.

The all-hosts layer upgrade page I/O contribution rate graph 2307 shows the "layer upgrade contribution rate of each task 500 in all host computing devices 100" in every time zone in which page layer rearrangement processing is carried out.

The user can decide which task 500 of which host computing device 100 is a cause of layer upgrade in page layer rearrangement processing in a certain time zone, by referring to the all-hosts layer upgrade page I/O contribution rate graph 2307. As shown in FIG. 21, it is recognized in the rearrangement processing at 06:00 that OLTP2 of host 2 is dominant and is therefore a cause of upgrade. Therefore, if processing of OLTP2 is important, the I/O monitoring necessity/unnecessity is configured to "necessity," and, if the processing of OLTP2 is not important, the I/O monitoring necessity/unnecessity is configured to "unnecessity." It should be noted that, even if "unnecessity" is applied to OLTP3 and antivirus A of a small proportion, it can say that it is not effective to prevent performance degradation by preventing low layer arrangement.

It should be noted that "the layer upgrade contribution rate of each task 500 in all host computing devices 100" displayed in the all-hosts layer upgrade page I/O contribution rate graph 2307 is calculated by the management software 600 from "the host I/O issue amount ratios of tasks 500 in each host computing device 100" displayed in the intra-host task I/O ratio graph 2306 and the "breakdown 2302 of the host computing devices of the layer upgrade capacity 2304." That is, "the layer upgrade contribution rate of each task 500 in all host computing devices 100" is obtained by multiplying "the host I/O issue amount ratio of each task 500 in each host computing device 100" by the ratio of "the breakdown 2302 of the host computing devices of the layer upgrade capacity 2304."

Here, a calculation example of "the layer upgrade contribution rate of each task 500 in all host computing devices 100" will be shown. In a case where the layer upgrade capacity 2304 is 100 GB and is made up of 70 GB of host 2 and 30 GB of host 3, the ratio of "the breakdown 2302 of the host computing devices of the layer upgrade capacity 2304" is 70% of host 2 and 30% of host 3. In a case where "the host I/O issue amount ratio of each task 500 in each host computing device 100" is made up of 100% of OLTP2 in host 2 and 40% of antivirus A and 60% of OLTP3 in host 3, "the layer upgrade contribution rate of each task 500 in all host computing devices 100" is made up of 70% (=70%×100%) of OLTP2, 12% (=30%×40%) of antivirus A and 18% (=30%×60%) of OLTP3.

<Rearrangement Capacity Management Table>

FIG. 22 is a view showing a configuration example of the rearrangement capacity management table 2400 created by the management software 600 and held in the management server 200.

The rearrangement capacity management table 2400 comprises a pool ID sequence 2401, a host ID sequence 2402, a rearrangement time zone sequence 2403, a layer upgrade capacity sequence 2404 and a layer downgrade capacity sequence 2405.

The pool ID sequence 2401 registers identifiers (i.e., identification information) to specify/identify the volume pool 700.

The host ID sequence 2404 registers identifiers (i.e., identification information) to specify/identify a host computing device to which a virtual volume created from a volume pool specified by the value of the pool ID sequence 2401 is assigned.

The rearrangement time zone sequence 2403 registers information showing time zones in which page layer rearrangement processing is carried out in the storage apparatus 400.

The layer upgrade capacity sequence 2404 and the layer downgrade capacity sequence 2405 register the sum capacities of page groups transferred from lower layers to higher layers in page layer rearrangement processing and the sum capacities of page groups transferred from higher layers to lower layers in page layer rearrangement processing, respectively.

The values of the layer upgrade capacity sequence 2404 and layer downgrade capacity sequence 2405 are calculated by the management software from 600 the host volume management table 1900, the virtual volume management table 1100 obtained from the storage apparatus 400, the volume pool management table 1200 and the rearrangement page management table 1800. For example, in the case of calculating the "layer upgrade capacities of host1 of pool1," among page groups of pool1 registered in the rearrangement page management table 1800, it is identified that "the value of the transfer destination layer sequence 1804 is higher than that of the transfer original layer sequence 1803" and "a host computing device of the assignment destination of the corresponding virtual volume is host1." This identification can be carried out by combining the virtual volume management table 1100 and the host volume management table 1900. By obtaining the identified page capacities from the volume pool management table 1200 and summing up them, it is possible to calculate the "layer upgrade capacities of host1 of pool1."

<Task Operation Information Management Table>

FIG. 23 is a view showing a configuration example of the task operation information management table 2500 held by the management server 200.

The task operation information management table 2500 holds history information of the task operation information 2200 of each host computing device 100 and is generated and updated by regularly obtaining, in the management software 600, the task operation information 2200 from each host computing device 100.

The task operation information management table 2500 comprises a host ID sequence 2501, a task name sequence 2502, an operation status sequence 2503, a host I/O issue amount sequence 2504 and an extraction time sequence 2505.

The host ID sequence 2501 registers identifiers (i.e., identification information) to specify/identify the host computing device 100.

Information registered in the task name sequence 2502, the operation status sequence 2503 and the host I/O issue amount sequence 2504 is the same as in the items of the same names in the task operation information 2200, and therefore explanation will be omitted.

The extraction time sequence 2505 registers the time at which the management software 600 obtains the task operation information 2200.

<I/O Monitoring OFF Recommendation Display Processing (I)>

Figure 24:
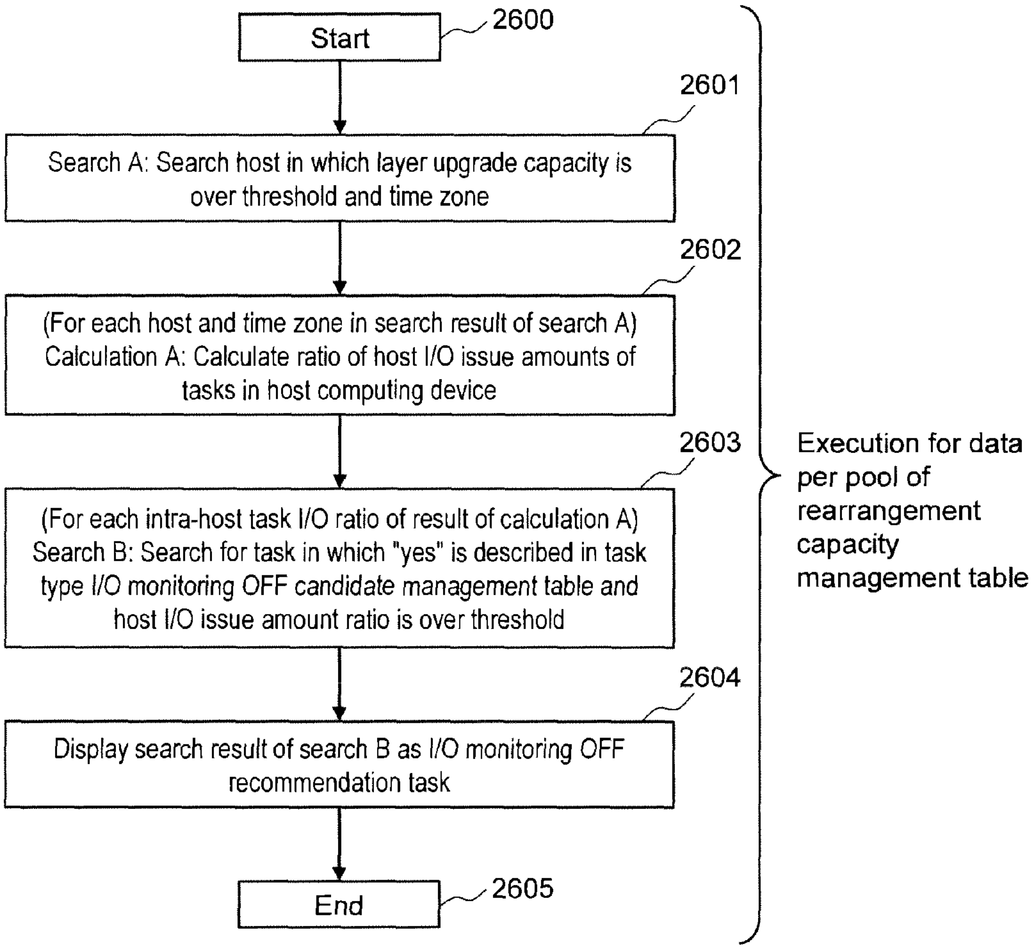
FIG. 24 is a flowchart for explaining I/O monitoring OFF recommendation display processing according to the embodiment of the present invention.

FIG. 24 is a flowchart for explaining I/O monitoring OFF recommendation display processing (example). In the present processing, the management software 600 automatically presents the task 500 requiring "I/O monitoring OFF" to the user. In FIG. 21, the user (or manager) decides a task of "I/O monitoring OFF" based on displayed graphs. Therefore, FIG. 24 differs from FIG. 21 in presenting a target task automatically, so that there is an advantage that the user does not have to make a decision.

The task 500 requiring "I/O monitoring OFF" presented in the present processing causes layer upgrade and generally denotes a task type requiring "I/O monitoring OFF." Further, the present processing is carried out every pool of the rearrangement capacity management table 2400 regularly or at the time of user instruction (step 2600). However, page layer rearrangement processing is carried out at least one time before step 2600, and data needs to be stored in the rearrangement capacity management table 2400 and the task operation information management table 2500. Here, the meaning of the term "regularly" is as described above. Each step explanation will be described below.

Step 2601: The management software 600 refers to the rearrangement capacity management table 2400 and searches a host computing device 100, in which the value of the layer upgrade capacity sequence 2404 is over a predetermined threshold, and the rearrangement time zone. For example, in the case where the threshold is 20 GB (or more), host1 at 20:00-24:00, host2 at 12:00-18:00, host2 at 6:00-12:00 and host3 at 24:00-6:00 are detected from the rearrangement capacity management table 2400.

Step S2602: The management software 600 calculates "the host I/O issue amount ratio of each task 500 in each host computing device 100" for each "host computing device 100 and rearrangement time zone" found by the search in step 2601. It should be noted that the "host I/O issue amount ratio of each task 500 in each host computing device 100" is the same as that used to display the intra-host task I/O ratio graph 2306.

Step 2603: Using the calculation result of step 2602 (i.e., "the host I/O issue amount ratio of each task 500 in each host computing device 100" with respect to each "host computing device 100 and rearrangement time zone"), the management software 600 searches for the task 500 in which "the task is a task type registered in a task type I/O monitoring OFF candidate management table 2700 (in FIG. 25) as an I/O monitoring OFF candidate" and "the host I/O issue amount ratio of each task 500 in each host computing device 100 is over a predetermined threshold."

Step 2604: If there is a task 500 obtained by the search in step 2603, the management software 600 presents it to the user as a task requiring "I/O monitoring OFF."

Figure 32:
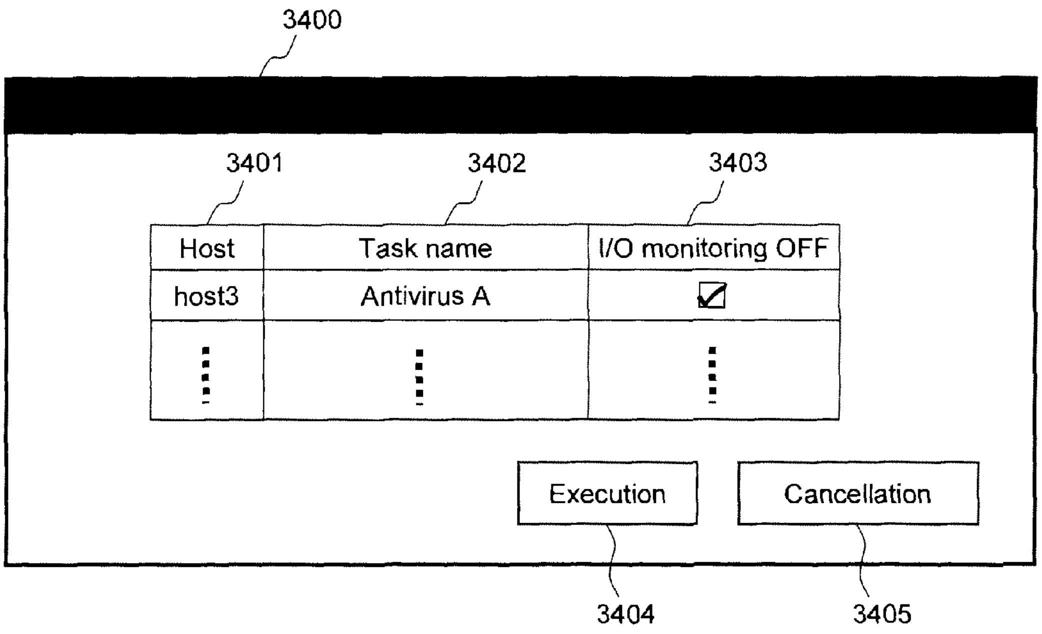
FIG. 32 is a view showing a configuration example of an I/O monitoring control configuration recommendation display screen according to the embodiment of the present invention.

It should be noted that FIG. 32 is a view showing a configuration example of an I/O monitoring control configuration recommendation display screen 3400 presented in step 2604. The I/O monitoring control configuration recommendation display screen 3400 comprises a host name 3401, a task name 3402, an I/O monitoring OFF checkbox 3403, an execution button 3404 and a cancellation button 3405.

In the host name 3401 and the task name 3402, the result obtained by the search in step 2603 is displayed.

By checking the I/O monitoring OFF checkbox 3403 and pressing the execution button 3404 by the user, "I/O monitoring OFF" of the task is possible. That is, it is possible to change the value of the I/O monitoring necessity/unnecessity sequence 2004 in the line of the task in the I/O monitoring necessity/unnecessity management table 2000, to "unnecessity," or display other information. Further, in the present step, it is equally possible to not only present a task requiring "I/O monitoring OFF" to the user but also allow "I/O monitoring OFF" automatically.

<Task Type I/O Monitoring OFF Candidate Management Table>

FIG. 25 is a view showing a configuration example of the task type I/O monitoring OFF candidate management table 2700 held by the management server 200 and referred to by the management software 600.

The task type I/O monitoring OFF candidate management table 2700 comprises a task type sequence 2701 and an I/O monitoring OFF candidate sequence 2702.

The task type sequence 2701 registers general types of tasks carried out on the host computing device 100.

The I/O monitoring OFF candidate sequence 2702 registers whether each task type is generally subjected to "I/O monitoring OFF" (yes) or not (no). For example, although an index formulation task generally issues many I/O's to form the index, an I/O is issued to data not essentially requiring a high response, and therefore this I/O should not be recorded ("I/O monitoring OFF" is required). It should be noted that the task type I/O monitoring OFF candidate management table 2700 may be held with fixed values (i.e. default values) by the management software 600 or may be adequately input by the user.

<I/O Monitoring OFF Recommendation Display Processing (II)>

Figure 26:
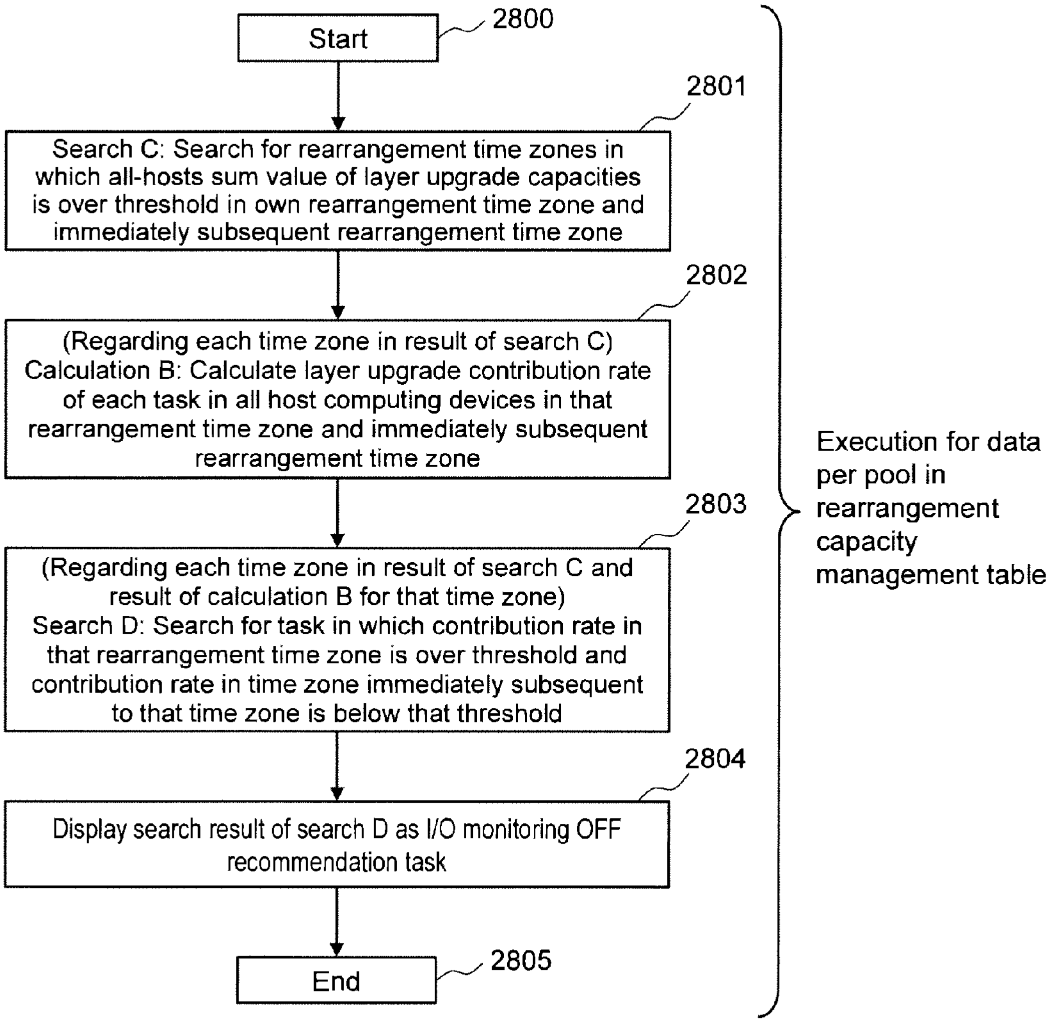
FIG. 26 is a flowchart for explaining I/O monitoring control configuration recommendation display processing according to the embodiment of the present invention.

FIG. 26 is a flowchart for explaining I/O monitoring OFF recommendation display processing different from that of FIG. 24. By the present processing, the management software 600 presents one of the tasks 500 requiring "I/O monitoring OFF" to the user. The task 500 (i.e., task A) requiring "I/O monitoring OFF" presented by the present processing causes layer upgrade equal to or greater than a predetermined threshold in a certain page layer rearrangement time zone and causes much layer upgrade of at least one different task 500 (i.e., task group B) in the next page layer rearrangement time zone. That is, a time zone, in which rearrangement processing equal to or greater than a predetermined threshold is carried out, is detected from two ("two" is not essential) consecutive time zones. This does not denote a time zone in which the occurrence amount of layer upgrade increases discretely, but means that a time zone, in which layer upgrade constantly occurs in a certain degree, is used as a processing target. In such the task A, the host I/O issue amount temporarily increases and a page group used in the task A is subjected to layer upgrade in page layer rearrangement processing, which may result in page layer downgrade of the task group B. The present processing is carried out every pool of the rearrangement capacity management table 2400 regularly or at the time of user instruction (step 2800). The meaning of the term "regularly" is as described above. It should be noted that page processing rearrangement processing is carried out at least twice before step 2800, and data needs to be stored in the rearrangement capacity management table 2400 and the task operation information management table 2500. Each step explanation will be described below.

Step 2801: The management software 600 refers to the rearrangement capacity management table 2400 and searches for rearrangement time zones of a rearrangement time zone to be focused (which is also referred to as "own rearrangement time zone"), the immediately subsequent rearrangement time zone and a rearrangement time zone in which the all-hosts sum value of layer upgrade capacities is over a predetermined threshold. It should be noted that, instead of the phrase "the own rearrangement time zone and immediately subsequent rearrangement time zone," the phrase "the own rearrangement time and one of k subsequent rearrangement time zones" is possible (where k is an arbitrary natural number). For example, the sum value (50 GB) of the layer upgrade capacities of host2 and host3 on 24:00-6:00 and the sum value (40 GB) of the layer upgrade capacities of host2 and host3 on 6:00-12:00 are both over a predetermined threshold (e.g., 35 GB), and therefore these time zones are detected as targets to which subsequent processing is applied.

Step 2802: The management software 600 calculates the "layer upgrade contribution rate of each task 500 in all host computing devices 100" with respect to rearrangement time zones obtained in step 2801 and the respective subsequent rearrangement time zones. "The layer upgrade contribution rate of each task 500 in all host computing devices 100" is the same as information used to display the all-hosts layer upgrade page I/O contribution rate graph 2307.

Step 2803: The management software 600 obtains one of the tasks 500 in which: the contribution rate is over a threshold among the "layer upgrade contribution rates of tasks 500 in all host computing devices 100" in an arbitrary rearrangement time zone, which is calculated in step 2802; and the contribution rate is less than the threshold among "the layer upgrade contribution rates of tasks 500 in all host computing devices 100" in the immediately subsequent rearrangement time zone. For example, regarding antivirus A, in a case where the contribution rate is over a threshold in a time zone of 18:00-24:00 but is less than the threshold in a time zone of 24:00-6:00, this antivirus A is obtained as a target task.

Step 2804: If there is the task 500 obtained by the search in step 2803, the management software 600 presents it to the user as a task requiring "I/O monitoring OFF." It should be noted that information presented in step 2804 is the same as in the I/O monitoring control configuration recommendation display screen 3400 shown in the above-noted FIG. 32. It should be noted that it is equally possible to not only present a task requiring "I/O monitoring OFF" to the user but also allow "I/O monitoring OFF" automatically.

The I/O monitoring OFF recommendation display processing shown in FIGS. 24 and 26 is an example, and there is other I/O monitoring OFF recommendation display processing. For example, the following task 500 may be presented to the user as a task requiring "I/O monitoring OFF." That is, the task 500 denotes a task which causes much layer upgrade in a certain page layer rearrangement time zone and in which most of the page group subjected to layer upgrade at that time are not frequently accessed after the layer upgrade. In such the task 500, although the host I/O issue amount is temporarily increased and much layer upgrade is caused, access is reduced since then, which results in a high possibility of causing nonsense layer upgrade. It should be noted that such the task 500 can be specified using the volume management table 1100, the rearrangement page management table 1800, the virtual host volume management table 1900, the rearrangement capacity management table 2400 and the task operation information management table 2500.

(2) Embodiment 2

Next, a computing device system according to Embodiment 2 of the present invention will be explained with reference to FIGS. 1 to 12, 15 to 18 and 20 to 26 used in Embodiment 1, in addition to FIGS. 27 to 29. It should be noted that Embodiment 1 and Embodiment 2 are different in the granularity of I/O monitoring ON/OFF control. That is, although Embodiment 1 carries out I/O monitoring ON/OFF control in virtual volume units, Embodiment 2 carries out I/O monitoring ON/OFF control in page units.

The system configuration according to Embodiment 2 is the same as that explained in Embodiment 1 using FIGS. 1 to 5. Also, the conceptual views, management tables and flowcharts shown in FIGS. 6 to 12, 15 to 18 and 20 to 26 are applied to the present embodiment. However, in Embodiment 2, the virtual volume 701 is not used as is as a host volume, and a program (i.e., host volume manager) for using, on the host computing device 100 as a virtual host volume, part or a plurality of areas on at least one virtual volume 701 may be provided on the host computing device 100 or other computing devices. It should be noted that the host volume manager holds mapping information between the virtual host volume and the part or the plurality of areas. Further, not only a physical machine but also a virtual machine may be provided as the host computing device 100.

<Page I/O Monitoring ON/OFF Management Table>

Figures 27, 28:
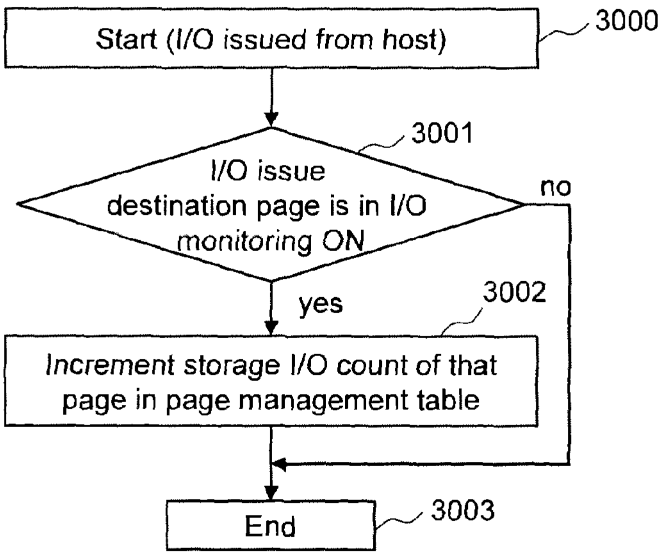
FIG. 27 is a view showing a configuration example of a page I/O monitoring ON/OFF management table according to Embodiment 2 of the present invention.
FIG. 28 is a flowchart for explaining I/O monitoring processing according to Embodiment 2 of the present invention.

FIG. 27 is a view showing a configuration example of a page I/O monitoring ON/OFF management table 2900. This table is used for I/O monitoring ON/OFF management in page units and is associated with FIG. 13 (i.e., a table for I/O monitoring ON/OFF management in virtual volume units) according to Embodiment 1.

The page I/O monitoring ON/OFF management table 2900 comprises a pool ID sequence 2901, a page D sequence 2902 and an I/O monitoring ON/OFF sequence 2903.

The pool ID sequence 2901 registers identifiers (i.e., identification information) to specify/identify the respective volume pools 700.

The page ID sequence 2902 registers identifiers (i.e., identification information) to specify/identify the pages of each volume pool 700.

The I/O monitoring ON/OFF sequence 2903 registers whether the I/O with respect to the page upon I/O monitoring processing is recorded (ON) or not (OFF). It should be noted that, similar to the I/O monitoring ON/OFF 1502 in FIG. 13, although a default value is configured as the initial value in this information, the value (ON/OFF) changes according to processing in FIG. 29 as the system operates sequentially.

<I/O Monitoring Processing>

FIG. 28 is a flowchart for explaining I/O monitoring processing (example) carried out by the virtual volume manger 704 according to Embodiment 2. The present embodiment is started at the time of issuing I/O's from the host computing device 100 to the virtual volume 701 in the storage apparatus 400 (step 3000).

First, the virtual volume manager 704 refers to the page I/O monitoring ON/OFF management table 2900 and checks whether the I/O monitoring ON/OFF 2903 of an I/O issue destination page is "ON" (step 3001). At this time, if the I/O monitoring ON/OFF 2903 is "OFF," the process ends (step 3003). If the I/O monitoring ON/OFF 2903 is "ON," the process proceeds to step 3002.

Then, the virtual volume manager 704 increments, by one, the number of the storage I/O count sequence 1206 in a line determined by the page ID of the I/O issue destination page and the pool ID of a volume pool in the volume pool management table 1200 (step 3002), and the process ends (step 3003).

<I/O Monitoring ON/OFF Control Processing>

Figure 29:
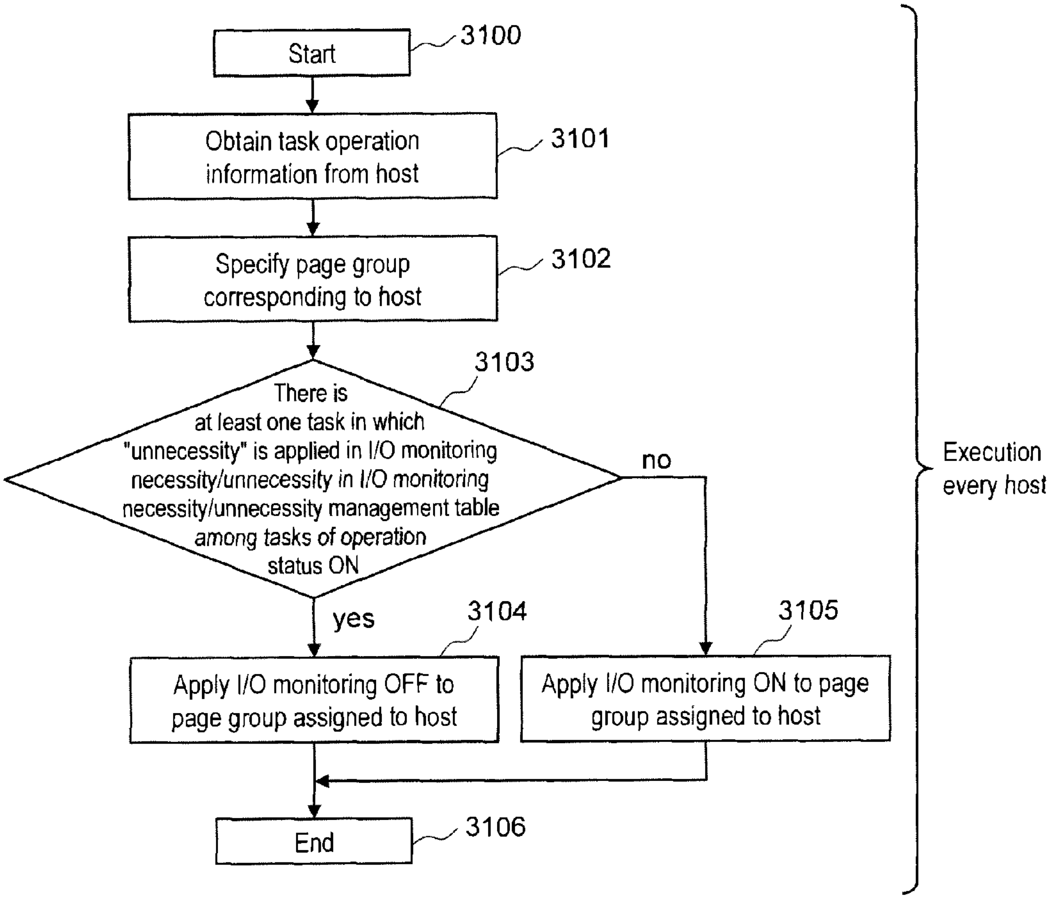
FIG. 29 is a flowchart for explaining I/O monitoring ON/OFF control processing according to Embodiment 2 of the present invention.

FIG. 29 is a flowchart for explaining I/O monitoring ON/OFF control processing (example) carried out by the management software 600. The present processing is regularly executed every host computing device 100 (step 3100). Here, the significance of the phrase "regularly" is as described above in Embodiment 1. Each step explanation will be described.

Step 3101: The management software 600 obtains the task operation information 2200 (see FIG. 20) from the OS 501 on the host computing device 100.

Step 3102: The management software 600 specifies a page group assigned to the host computing device 100. In this processing, first, the management software 600 obtains, from the OS 501 on the host computing device 100, LBA ranges on the virtual volume 701 used by the host computing device 100. In this case, the OS 501 on the host computing device 100 manages the LBA ranges on the virtual volume 701 used by the host computing device. Also, if the host computing device 100 uses a partial area on the virtual volume 701 as a virtual host volume by the host volume manager, the management software 600 obtains an LBA range corresponding to the area from the host volume manager. Next, the management software 600 can specify a page group assigned to the host computing device 100 by checking the obtained LBA range using the virtual volume management table 1100 (in FIG. 9).

Step 3103: Regarding the task operation information 2200 obtained in step 3101, the management software 600 decides whether there is at least one task in which "the operation status 2202 is ON" and "the value of the I/O monitoring necessity/unnecessity sequence 2004 is "unnecessity" in the I/O monitoring necessity/unnecessity management table 2000. In the case of "yes" in the decision result of step 3103, the process proceeds to step 3104, and, in the case of "no" in the decision result, the process proceeds to step 3105. It should be noted that, as the condition, a condition of "the host I/O issue amount 2203 equal to or greater than a threshold" is possible, instead of a condition that "the operation status 2202 is ON." Also, although "the management software 600 decides whether there is at least one task," this can be replaced with description "the management software 600 decides whether there is a task equal to or greater than a threshold." This modification example is the same as in the case of Embodiment 1.

Step 3104: The management software 600 applies "I/O monitoring OFF" to a page group specified in step 3102. That is, the management software 600 transmits an I/O monitoring OFF instruction including a volume pool identifier and the page ID of the page group to the storage apparatus 400. After that, the storage apparatus 400 having received this OFF instruction applies "OFF" to the value of the I/O monitoring ON/OFF sequence 2903 of the corresponding pool ID and page ID in the page I/O monitoring ON/OFF management table 2900 (in FIG. 27).

Step 3105: The management software 600 applies "I/O monitoring ON" to the page group specified in step 3102. That is, the management software 600 transmits an I/O monitoring ON instruction including the pool ID of the volume pool and the page ID of the page group, to the storage apparatus 400. Then, the storage apparatus 400 having received this instruction applies "ON" to the I/O monitoring ON/OFF sequence 2903 of the corresponding pool ID and page ID in the page I/O monitoring ON/OFF management table 2900.

(3) Embodiment 3

Next, a computing device system according to Embodiment 3 of the present invention will be explained with reference to FIGS. 1 to 18 and 20 to 26 used in Embodiment 1 in addition to FIG. 30. It should be noted that Embodiment 3 is different from Embodiment 1 in that I/O monitoring ON/OFF control processing is not carried out by the management software 600 of the management server 200 but is carried out by the OS 501 on each host computing device 100 or the OS 501 of a representative host computing device. Therefore, the management software 600 plays a role of presenting the I/O monitoring ON/OFF decision information display screen 2300 (in FIG. 21) to the user.

The system configuration according to the present embodiment is the same as explained in Embodiment 1 using FIGS. 1 to 5. Also, the conceptual views, management tables and flowcharts shown in FIGS. 6 to 18 and 20 to 26 are applied to the present embodiment. However, in a case where the I/O monitoring ON/OFF decision information display screen 2300 needs not be presented, the management software 600 is not necessarily required. Also, the management software 600 holds the I/O monitoring necessity/unnecessity management table 2000 and each host computing device 100 holds partial information (such as the task name, task type and I/O monitoring necessity/unnecessity) of the own host ID. The I/O monitoring necessity/unnecessity management table 2000 held by the management software 600 and the I/O monitoring necessity/unnecessity management table partial information held by each host computing device 100 are synchronized. Therefore, in the case of inputting the I/O monitoring necessity/unnecessity management table 2000 by the user, the input may be made on the management software 600 or on each host computing device 100.

<I/O Monitoring ON/Off Control Processing>

Figure 30:
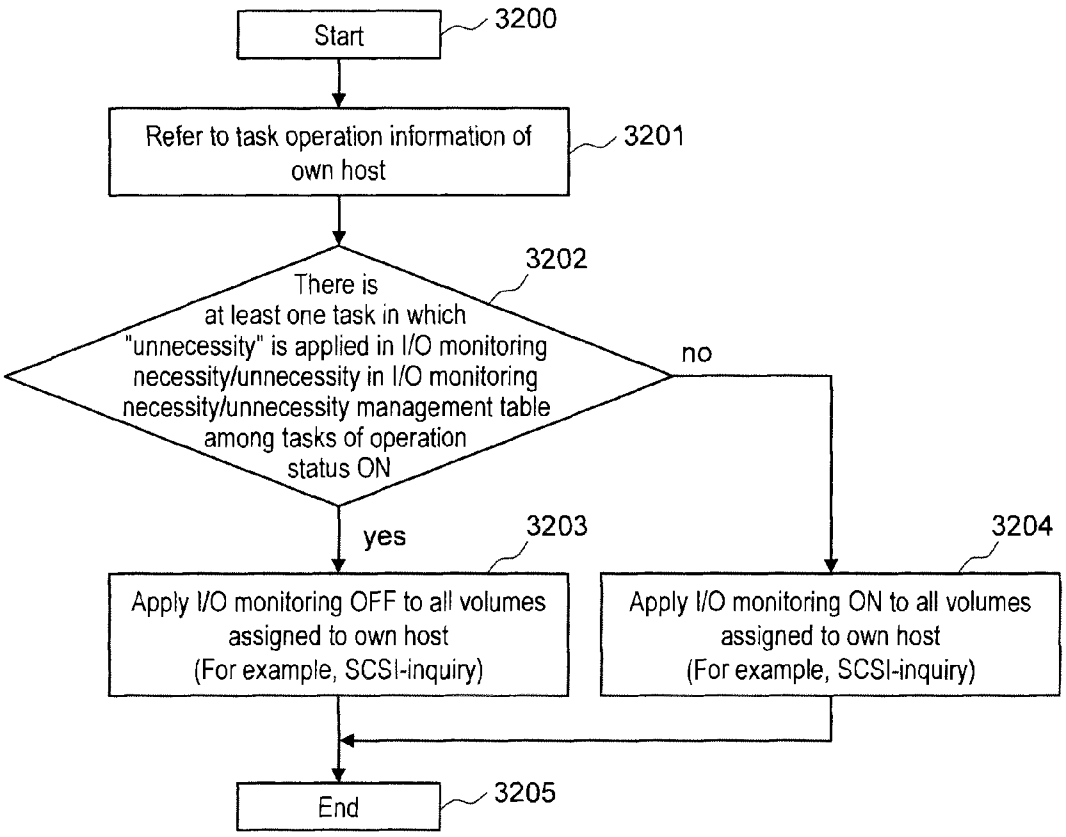
FIG. 30 is a flowchart for explaining I/O monitoring ON/OFF control processing according to Embodiment 3 of the present invention.

FIG. 30 is a flowchart showing an example of I/O monitoring ON/OFF control processing. The present processing is regularly executed by the OS 501 on each host computing device 100 (step 3200). Here, the significance of the phrase "regularly" is as described above. Each step explanation will be described.

Step 3201: The OS 501 on each host computing device 100 refers to the task operation information 2200 (in FIG. 20) of each host computing device (i.e., own host).

Step 3202: Regarding the task operation information 2200, the OS 501 on each host computing device 100 decides whether there is at least one task in which "the operation status 2202 is ON" and "the value of the I/O monitoring necessity/unnecessity sequence 2004 is "unnecessity" in the I/O monitoring necessity/unnecessity management table 2000." In the case of "yes" in the decision result of step 3202, the process proceeds to step 3203, and, in the case of "no" in the decision result, the process proceeds to step 3204. It should be noted that, as a task precondition, a condition of "the host I/O issue amount 2203 equal to or greater than a threshold" is possible, instead of a condition that "the operation status is ON." Also, although "the OS 501 on the host computing device 100 decides whether there is at least one task," this can be replaced with description "the OS 501 on the host computing device 100 decides whether there is a task equal to or greater than a threshold." This modification example is the same as in the case of Embodiment 1.

Step 3203: The OS 501 on each host computing device 100 applies "I/O monitoring OFF" to the volume assigned to each corresponding host computing device (i.e., own host computing device). In this processing, an I/O monitoring OFF instruction including a virtual volume ID is issued to the storage apparatus 400 by, for example, SCSI Inquiry. Then, the storage apparatus 400 having received this OFF instruction applies "OFF" to the value of the I/O monitoring ON/OFF sequence 1502 of the corresponding virtual volume ID in the virtual volume I/O monitoring ON/OFF management table 1500 (in FIG. 13).

Step 3204: The OS 501 on each host computing device 100 applies "I/O monitoring ON" to the volume assigned to each corresponding host computing device (i.e. own host computing device). In this processing, an I/O monitoring ON instruction including a virtual volume ID is issued to the storage apparatus 400 by, for example, SCSI Inquiry. Then, the storage apparatus 400 having received this ON instruction applies "ON" to the value of the I/O monitoring ON/OFF sequence 1502 of the corresponding virtual volume ID in the virtual volume I/O monitoring ON/OFF management table 1500.

(4) Embodiment 4

Next, a computing device system according to Embodiment 4 of the present invention will be explained with reference to FIGS. 1 to 12, 15 to 18 and 20 to 26 used in Embodiment 1 and FIGS. 27 and 28 used in Embodiment 2 in addition to FIG. 31. Embodiment 4 is different from Embodiment 1 in that "I/O monitoring ON/OFF control processing is not carried out by the management software 600 but is carried out by the OS 501 on each host computing device 100" and "I/O monitoring ON/OFF control is carried out in page units." That is, the difference is a combination of those of Embodiment 2 and Embodiment 3. Therefore, the management software 600 plays a role of presenting the I/O monitoring ON/OFF decision information display screen 2300 to the user.

The system configuration of the present embodiment is the same as that explained using FIGS. 1 to 5 in Embodiment 1. Also, the conceptual views, management tables and flowcharts shown in FIGS. 6 to 18 and 20 to 26 are applied to the present embodiment. However, in a case where the I/O monitoring ON/OFF decision information display screen 2300 needs not be presented, the management software 600 is not necessarily required. Also, the management software 600 holds the I/O monitoring necessity/unnecessity management table 2000 and each host computing device 100 holds partial information (such as the task name, task type and I/O monitoring necessity/unnecessity) of the own host ID. Also, the I/O monitoring necessity/unnecessity management table 2000 held by the management server 200 and used by the management software 600 and the I/O monitoring necessity/unnecessity management table partial information held by each host computing device 100 are synchronized. Therefore, in the case of inputting the I/O monitoring necessity/unnecessity management table 2000 by the user, the input may be made on the management software 600 of the management server 200 or on each host computing device 100. Further, the virtual volume 701 is not used as it is as a host volume, and a program (i.e., host volume manager) for using, on the host computing device 100 as a virtual host volume, part or a plurality of areas on at least one virtual volume 701 may be provided on the host computing device 100 or other computing devices. It should be noted that the host volume manager holds mapping information between the virtual host volume and the part or the plurality of areas.

<I/O Monitoring ON/OFF Control Processing>

Figure 31:
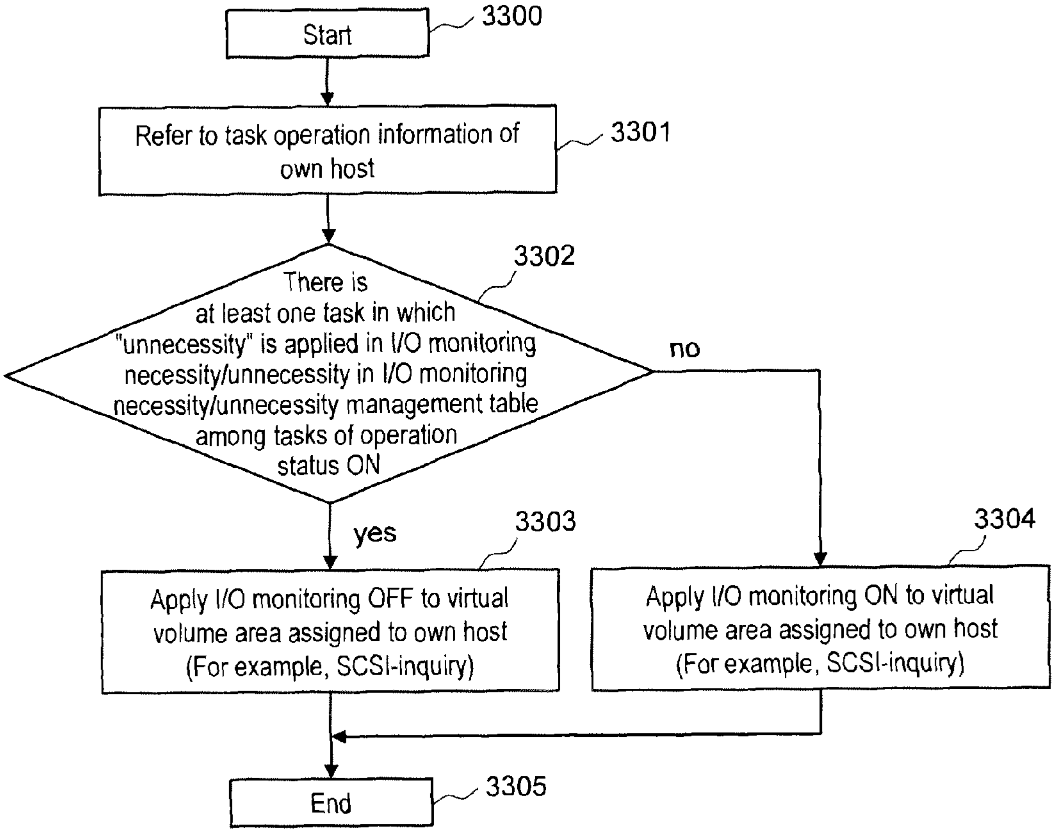
FIG. 31 is a flowchart for explaining I/O monitoring ON/OFF control processing according to Embodiment 4 of the present invention.

FIG. 31 is a flowchart for explaining I/O monitoring ON/OFF control processing (example) according to Embodiment 4. The present processing is regularly executed by the OS 501 on each host computing device 100 (step 3300). Here, the significance of the phrase "regularly" is as described above. Each step explanation will be described.

Step 3301: The OS 501 on each host computing device 100 refers to the task operation information 2200 (in FIG. 20) of each corresponding host computing device (i.e., own host computing device).

Step 3302: Regarding the task operation information 2200, the OS 501 on each host computing device 100 decides whether there is at least one task in which "the operation status 2202 is ON" and "the value of the I/O monitoring necessity/unnecessity sequence 2004 is "unnecessity" in the I/O monitoring necessity/unnecessity management table 2000." In the case of "yes" in the decision result of step 3302, the process proceeds to step 303, and, in the case of "no" in the decision result, the process proceeds to step 3304. It should be noted that, as a task precondition, a condition of "the host I/O issue amount 2203 equal to or greater than a threshold" is possible, instead of a condition that "the operation status is ON." Also, although "the OS 501 on the host computing device 100 decides whether there is at least one task," this can be replaced with description "the OS 501 on the host computing device 100 decides whether there is a task equal to or greater than a threshold." This modification example is the same as in the case of Embodiment 1.

Step 3303: The OS 501 on each host computing device 100 applies "I/O monitoring OFF" in at least one area on the virtual volume 701. In this processing, an I/O monitoring OFF instruction including the virtual volume ID and LBA range is transmitted to the storage apparatus 400 by, for example, SCSI Inquiry. The storage apparatus 400 having received this OFF instruction refers to the virtual volume management table 1100 (in FIG. 9), specifies the pool ID and page ID corresponding to the instructed virtual volume ID and LBA range, and, based on these specified pool ID and page ID, applies "OFF" to the value of the I/O monitoring ON/OFF sequence 2903 in the page I/O monitoring ON/OFF management table 2900 (in FIG. 27). In this case, the OS 501 manages LBA ranges on the virtual volume 701 used by each corresponding host computing device (i.e., own host computing device). It should be noted that, if the host computing device 100 uses a partial area on the virtual volume 701 as a virtual host volume by the host volume manager, the OS 501 on the host computing device 100 issues an I/O monitoring OFF instruction related to the virtual host volume to the host volume manager. The host volume manager receives this instruction and transmits, by SCSI Inquiry for example, an I/O monitoring OFF instruction including the virtual volume ID and LBA ranges on the virtual volume 701 corresponding to the virtual host volume, to the storage apparatus 400.

Step 3304: The OS 501 on each host computing device 100 applies "I/O monitoring ON" in at least one area on the virtual volume 701 assigned to each corresponding host computing device (i.e., own host computing device). In this processing, an I/O monitoring ON instruction including the virtual volume ID and LBA range is transmitted to the storage apparatus 400 by, for example, SCSI Inquiry. The storage apparatus 400 having received this ON instruction refers to the virtual volume management table 1100, specifies the pool ID and page ID corresponding to the instructed virtual volume ID and LBA range, and, based on these specified pool ID and page ID, applies "ON" to the value of the I/O monitoring ON/OFF sequence 1502 in the page I/O monitoring ON/OFF management table 2900. In this case, the OS 501 manages LBA ranges on the virtual volume 701 used by each corresponding host computing device (i.e., own host computing device). It should be noted that, if the host computing device 100 uses a partial area on the virtual volume 701 as a virtual host volume by the host volume manager, the OS 501 on the host computing device 100 issues an I/O monitoring ON instruction related to the virtual host volume to the host volume manager. The host volume manager receives this instruction and transmits, by SCSI Inquiry for example, an I/O monitoring ON instruction including the virtual volume ID and LBA ranges on the virtual volume 701 corresponding to the virtual host volume, to the storage apparatus 400.

(5) Conclusion

In each embodiment of the present invention, a storage apparatus carries out rearrangement processing based on the access characteristic (e.g., I/O count) related to tasks executed on a plurality of computing devices (i.e., host computing devices). In this case, a management computing device or host computing device monitors the I/O count in virtual logical volume units, the I/O count in units of pages comprising a virtual volume (i.e., in units of access to an actual storage area of a virtual logical volume) or the I/O count issued by the host computing device (i.e., in units of access to a storage subsystem by the host computing device that executes a task), thereby deciding whether rearrangement processing is carried out. Here, the embodiments configure I/O monitoring ON/OFF management information (see FIGS. 13 and 27) to show whether I/O monitoring is carried out. Then, the storage apparatus refers to this I/O monitoring ON/OFF management information and carries out rearrangement processing based on the I/O count from the monitored host computing device. Although embodiments configure information (i.e., I/O monitoring ON/OFF management information) to show whether I/O monitoring is carried out, even if the I/O count (i.e., access characteristic) is monitored, the I/O count may not be used for rearrangement processing necessity/unnecessity decision, and therefore it is possible to simply adopt expression "configure rearrangement reference information showing whether it is considered as a decision criterion for transfer destination in rearrangement processing," instead of I/O monitoring ON/OFF management information. By this means, a predetermined virtual volume, a page or a host volume need not be used for rearrangement processing necessity/unnecessity decision, so that it is possible to prevent unnecessary rearrangement processing.

Also, in each embodiment of the present invention, a management computing device or host computing device generates and outputs information (i.e., rearrangement occurrence information including an intra-host task I/O ratio and all-hosts layer upgrade page I/O contribution rate) showing the data rearrangement occurrence amount (at least layer upgrade capacity) per storage area used by tasks executed in a plurality of host computing devices (or the own host computing device in a case where each host computing device has a management computing device function (i.e. in the case of Example 3)) (see FIG. 21). By this means, the user (or manager) can determine the I/O monitoring necessity/unnecessity (i.e., rearrangement processing necessity/unnecessity) for each task with reference to the output information. Therefore, the user can determine the I/O monitoring necessity/unnecessity along the execution tendency of each task, so that it is possible to provide a computing device system (or storage system) that is easily managed by the user.

On the other hand, it may be possible to automatically configure the I/O monitoring necessity/unnecessity (i.e., rearrangement processing necessity/unnecessity) or present a task recommended to be "monitoring OFF" to the user. By this means, the user who is not familiar with I/O monitoring necessity/unnecessity decision can appropriately manage the storage system. It should be noted that, specifically, a monitoring OFF recommendation task display can be realized by executing the processing shown in FIGS. 24 and 26.

(ii) The present invention can be realized by a program code of software realizing the functions of embodiments. In this case, a storage medium recording the program code is provided to a system or apparatus, and a computer (or CPU or MPU) of the system or apparatus reads the program code stored in the storage medium. In this case, the program code itself read from the storage medium realizes the above-noted functions of embodiments, and the program code itself and the storage medium storing the program code form the present invention. Examples of storage media used to provide such a program code include a flexible disk, CD-ROM, DVD-ROM, hard disk, optical disk, magnetooptical disk, CD-R, magnetic tape, nonvolatile memory card and ROM.

Also, based on the program code instruction, an OS (Operating System) operating on a computer may carry out part or whole of actual processing and realize the functions of above-noted embodiments by the processing. Further, after the program code read from a storage medium is written in a memory on a computer, for example, the computer CPU may carry our part or whole of actual processing based on the program code instruction and realize the functions of above-noted embodiments by the processing.

Further, by delivering a software program code to realize the functions of the embodiments via a network, it may be possible to store the program code in a storage section such as a hard disk and memory in a system or apparatus, or store it in a storage medium such as CD-RW and CD-R, and, upon use, allow a computer (or CPU or MPU) of the system or apparatus to read and execute the program code stored in the storage section or the storage medium.

Finally, it is necessary to understand that the above-described process and techniques are not essentially related to any specific apparatuses but can be realized by any suitable combinations of components. Further, it is possible to use various types of general-purpose devices according to the above-noted teaching. It may be understood that forming a dedicated apparatus is effective to execute the steps of the above-described method. Also, it is possible to form various aspects of the invention by suitably combining a plurality of components disclosed in the embodiments. For example, some components may be removed from all components disclosed in the embodiments. Further, some components between embodiments may be appropriately combined. Although the present invention is described in association with specific examples, these are not provided for limitation in all views but are provided for explanation. Those skilled in the art can understand that many combinations of hardware, software and firmware suitable to implement the present invention are provided. For example, the described software can be implemented by wide-range program or script language such as assembler, C/C++, perl, Shell, PHP and Java (registered trademark).

Further, the above-noted embodiments show control lines and information lines considered to be required for explanation, and all control lines and information lines on products may not be necessarily shown. All components may be connected to one another.

In addition, for a person having normal knowledge of the present technical field, other implementations of the present invention are clear from consideration of the disclosed specification and embodiments of the present invention. The various aspects and/or components of the described embodiments can be used independently or by any combinations in a computerized storage system having a function of data management. The specification and specific examples are just typical examples, and the scope and spirit of the present invention are defined in the following claims.

REFERENCE SIGNS LIST

100 HOST COMPUTING DEVICE
200 MANAGEMENT SERVER (MANAGEMENT COMPUTING DEVICE)
300 SAN
301 LAN
400 STORAGE APPARATUS
700 VOLUME POOL
701 VIRTUAL VOLUME (VIRTUAL LOGICAL VOLUME)
800 to 803 PHYSICAL DISK
900 LOGICAL VOLUME MANAGEMENT TABLE (LOGICAL VOLUME MANAGEMENT INFORMATION)
1100 VIRTUAL VOLUME MANAGEMENT TABLE (VIRTUAL VOLUME MANAGEMENT INFORMATION)
1200 VOLUME POOL MANAGEMENT TABLE (VOLUME POOL MANAGEMENT INFORMATION)
1300 POOL LAYER MANAGEMENT TABLE (POOL LAYER MANAGEMENT INFORMATION)
1400 UNUSED AREA MANAGEMENT TABLE (UNUSED AREA MANAGEMENT INFORMATION)
1500 VIRTUAL VOLUME I/O MONITORING ON/OFF MANAGEMENT TABLE (VIRTUAL VOLUME I/O MONITORING ON/OFF MANAGEMENT INFORMATION)
1800 REARRANGEMENT PAGE MANAGEMENT TABLE (REARRANGEMENT PAGE MANAGEMENT INFORMATION)
1900 HOST VOLUME MANAGEMENT TABLE (HOST VOLUME MANAGEMENT INFORMATION)
2000 I/O MONITORING NECESSITY/UNNECESSITY MANAGEMENT TABLE (I/O MONITORING NECESSITY/UNNECESSITY MANAGEMENT INFORMATION)
2200 TASK OPERATION INFORMATION
2400 REARRANGEMENT CAPACITY MANAGEMENT TABLE (REARRANGEMENT CAPACITY MANAGEMENT INFORMATION)
2500 TASK OPERATION INFORMATION MANAGEMENT TABLE (TASK OPERATION MANAGEMENT INFORMATION)
2700 TASK TYPE I/O MONITORING OFF CANDIDATE MANAGEMENT TABLE (TASK TYPE I/O MONITORING OFF CANDIDATE MANAGEMENT INFORMATION)
2900 PAGE I/O MONITORING ON/OFF MANAGEMENT TABLE (PAGE I/O MONITORING ON/OFF MANAGEMENT INFORMATION)

The invention claimed is:

1. A computing device system comprising at least one storage subsystem and a plurality of computing devices connected to the at least one storage subsystem, the at least one storage subsystem comprising:

a plurality of physical storage devices of different response performances;

a memory configured to store virtual logical volume management information associating a pool including actual storage areas of the plurality of physical storage devices with at least one virtual logical volume comprising the pool; and a processor configured to execute processing of assigning an actual storage area included in the at least one virtual logical volume to one of the plurality of computing devices, wherein at least one computing device of the plurality of computing devices is configured to manage rearrangement reference information showing whether a characteristic of accesses counted with respect to each of a plurality of predetermined units is considered as a decision criterion for transfer destination determination in rearrangement processing of transferring data between actual storage areas of the plurality of physical storage devices of the different response performances, and wherein the processor of the at least one storage subsystem is configured to refer to the rearrangement reference information and, based on the characteristic of accesses of the plurality of computing devices with respect to the actual storage areas assigned to the plurality of computing devices, to execute rearrangement processing of transferring data stored in the actual storage areas to different actual storage areas in the plurality of physical storage devices of the different response performances.

2. The computing device system according to claim 1, wherein the characteristic of accesses is an access characteristic related to a task executed on the plurality of computing devices, and wherein at least one computing device of the plurality of computing devices is configured to manage rearrangement reference information showing whether the access characteristic related to the task executed on the plurality of computing devices is considered as a decision criterion for transfer destination determination in rearrangement processing of transferring data between the actual storage areas of the physical storage devices of different response performances.

3. The computing device system according to claim 2, wherein the at least one computing device of the plurality of computing devices is configured to generate and output rearrangement occurrence information showing a rearrangement occurrence amount of data per storage area used by the task executed on a subset of the plurality of computing devices.

4. The computing device system according to claim 3, wherein, based on the rearrangement occurrence information, the at least one computing device is configured to determine rearrangement necessity/unnecessity information showing a task requiring the rearrangement processing, and to manage the rearrangement reference information based on the rearrangement necessity/unnecessity information.

5. The computing device system according to claim 4, wherein the at least one computing device is configured to determine the rearrangement necessity/unnecessity information in response to an instruction input by a user according to an output of the rearrangement occurrence information.

6. The computing device system according to claim 4, wherein the at least one computing device is configured to:

hold decision elimination candidate information showing a task that is a candidate to be eliminated from the decision criterion for the transfer destination determination in the rearrangement processing with respect to a plurality of tasks;

calculate first rearrangement occurrence ratio information showing a ratio of data rearrangement occurrence amounts of tasks for each of the computing devices;

specify a task which is included in the decision elimination candidate information and in which the first rearrangement occurrence ratio information exceeds a first threshold; and output the specified task as the rearrangement necessity/unnecessity information.

7. The computing device system according to claim 4, wherein the at least one computing device is configured to:

generate the rearrangement occurrence information over a plurality of time zones in which the rearrangement processing is executed;

specify at least two consecutive time zones in which a sum value of rearrangement occurrence amounts of data related to all computing devices executing tasks exceeds a second threshold;

calculate second rearrangement occurrence ratio information showing a ratio of rearrangement occurrence amounts of the data related to all computing devices executing the task, in each of the specified consecutive time zones;

specify a task in which the second rearrangement occurrence ratio information of one of the at least two specified consecutive time zones exceeds a third threshold, and the second rearrangement occurrence ratio information of another of the at least two specified consecutive time zones is below the third threshold; and output the specified task as the rearrangement necessity/unnecessity information.

8. The computing device system according to claim 2, wherein the plurality of computing devices comprises a plurality of host computing devices and at least one management computing device, and wherein the at least one computing device that is configured to manage the rearrangement reference information is the at least one management computing device.

9. The computing device system according to claim 2, wherein the plurality of computing devices comprises a plurality of host computing devices and at least one management computing device, and wherein each of the plurality of host computing devices is configured to manage the rearrangement reference information related to an own host computing device.

10. The computing device system according to claim 2, wherein the at least one computing device is configured to manage the rearrangement reference information in a unit of the virtual logical volume, in a unit of access for the at least one storage subsystem by the computing devices executing the task, or in a unit of access for the actual storage area of the at least one virtual logical volume.

11. The computing device system according to claim 3, wherein the at least one computing device employs a data amount rearranged from a first layer to a second layer as the rearrangement occurrence amount of the data, wherein the first layer comprises a physical storage device having a response performance equal to a predetermined value, and wherein the second layer comprises a physical storage device having a higher response performance than that of the first layer.

12. An information management method for a computing device system comprising at least one storage subsystem and a plurality of computing devices connected to the at least one storage subsystem, the at least one storage subsystem comprising:

a plurality of physical storage devices of different response performances;

a memory configured to store virtual logical volume management information associating a pool including actual storage areas of the plurality of physical storage devices with at least one virtual logical volume comprising the pool; and a processor configured to execute processing for assigning an actual storage area included in the at least one virtual logical volume for one of the plurality of computing devices, the information management method comprising:

configuring, by at least one computing device of the plurality of computing devices, rearrangement reference information showing whether a characteristic of accesses counted with respect to each of a plurality of predetermined units is considered as a decision criterion for transfer destination determination in rearrangement processing of transferring data between the actual storage areas of the plurality of physical storage devices of the different response performances, referencing, by the processor, the rearrangement reference information, and executing, by the processor, rearrangement processing so as to transfer data stored in the actual storage areas to different actual storage areas in the plurality of physical storage devices of the different response performances, based on an access characteristic of the plurality of computing devices with respect to the actual storage areas assigned to the plurality of computing devices.

13. The information management method according to claim 12, wherein the characteristic of accesses is an access characteristic related to a task executed on the plurality of computing devices, and wherein the method further includes managing, by at least one computing device of the plurality of computing devices, rearrangement reference information showing whether the access characteristic related to a task executed on the plurality of computing devices is considered as a decision criterion for transfer destination determination in rearrangement processing of transferring data between the actual storage areas of the plurality of physical storage devices of the different response performances.

14. The information management method according to claim 13, further comprising: generating and outputting, by the at least one computing device of the plurality of computing devices, rearrangement occurrence information showing a rearrangement occurrence amount of data per storage area used by the task executed on a subset of the plurality of computing devices.

15. The information management method according to claim 14, further comprising:

determining, by the at least one computing device, rearrangement necessity/unnecessity information showing a task requiring the rearrangement processing, based on the rearrangement occurrence information, and managing, by the at least one computing device, the rearrangement reference information based on the rearrangement necessity/unnecessity information.

16. The information management method according to claim 15, further comprising the at least one computing device performing the steps:

holding, by the at least one computing device, decision elimination candidate information showing a task that is a candidate to be eliminated from the decision criterion for the transfer destination determination in the rearrangement processing with respect to a plurality of tasks, calculating first rearrangement occurrence ratio information showing a ratio of data rearrangement occurrence amounts of tasks for each of the computing devices, specifying a task which is included in the decision elimination candidate information and in which the first rearrangement occurrence ratio information is over a first threshold, and outputting the specified task as the rearrangement necessity/unnecessity information.

17. The information management method according to claim 15, further comprising the at least one computing device performing the steps:

generating the rearrangement occurrence information over a plurality of time zones in which the rearrangement processing is executed;

specifying at least two consecutive time zones in which a sum value of rearrangement occurrence amounts of the data related to all computing devices executing tasks exceeds a second threshold;

calculating second rearrangement occurrence ratio information showing a ratio of rearrangement occurrence amounts of the data related to all computing devices executing the task, in each of the specified consecutive time zones;

specifying a task in which the second rearrangement occurrence ratio information of one of the specified at least two consecutive time zones exceeds a third threshold and in which the second rearrangement occurrence ratio information of another of the specified at least two consecutive time zones is below the third threshold; and outputting the specified task as the rearrangement necessity/unnecessity information.

* * * * *

UNITED STATES PATENT AND TRADEMARK OFFICE
CERTIFICATE OF CORRECTION

PATENT NO. : 8,868,872 B2
APPLICATION NO. : 14/163653
DATED : October 21, 2014
INVENTOR(S) : Nobuhito Mori et al.

It is certified that error appears in the above-identified patent and that said Letters Patent is hereby corrected as shown below:

On the title page

Item (72) Inventors: 3rd inventor

Please replace "Juichi" with --Junichi--

Signed and Sealed this
Twenty-first Day of April, 2015

Michelle K. Lee
*Director of the United States Patent and Trademark Office*